United States Patent
Vaidya et al.

(10) Patent No.: US 11,817,117 B2
(45) Date of Patent: Nov. 14, 2023

(54) SPEAKER ADAPTIVE END OF SPEECH DETECTION FOR CONVERSATIONAL AI APPLICATIONS

(71) Applicant: NVIDIA Corporation, Santa Clara, CA (US)

(72) Inventors: Utkarsh Vaidya, Jabalpur (IN); Ravindra Yeshwant Lokhande, Pune (IN); Viraj Gangadhar Karandikar, Pune (IN); Niranjan Rajendra Wartikar, Pune (IN); Sumit Kumar Bhattacharya, Pune (IN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/162,907

(22) Filed: Jan. 29, 2021

(65) Prior Publication Data
US 2022/0246167 A1    Aug. 4, 2022

(51) Int. Cl.
G10L 25/78    (2013.01)
G10L 25/30    (2013.01)
G06N 3/02    (2006.01)

(52) U.S. Cl.
CPC ............... *G10L 25/78* (2013.01); *G06N 3/02* (2013.01); *G10L 25/30* (2013.01); *G10L 2025/786* (2013.01)

(58) Field of Classification Search
CPC ... G10L 25/78; G10L 25/30; G10L 2025/786; G06N 3/02
See application file for complete search history.

(56) References Cited

U.S. PATENT DOCUMENTS

| | | | | |
|---|---|---|---|---|
| 4,158,750 A | * | 6/1979 | Sakoe | G10L 25/87 704/E11.005 |
| 5,241,649 A | * | 8/1993 | Niyada | G10L 15/10 704/251 |
| 9,437,186 B1 | * | 9/2016 | Liu | G10L 15/05 |
| 10,109,279 B1 | * | 10/2018 | Poirier | G10L 15/32 |
| 10,186,254 B2 | | 1/2019 | Williams et al. | |
| 10,339,918 B2 | | 7/2019 | Hofer et al. | |
| 11,056,098 B1 | | 7/2021 | Gejji | |
| 11,138,979 B1 | * | 10/2021 | Cheng | G06N 3/08 |
| 11,458,409 B2 | * | 10/2022 | Thomas | A63F 13/67 |

(Continued)

FOREIGN PATENT DOCUMENTS

| | | |
|---|---|---|
| CN | 111243595 A | 6/2020 |
| WO | 2019084228 A1 | 5/2019 |
| WO | 2020036195 A1 | 2/2020 |

OTHER PUBLICATIONS

"Comparison of Decoding Strategies for CTC Acoustic Models," Thomas Zenkel, Ramon Sanabria, Florian Metze, Jan Niehues, Matthias Sperber, Sebastian Stüker, Alex Waibel, Aug. 15, 2017. (Year: 2017).*

(Continued)

*Primary Examiner* — Fariba Sirjani
(74) *Attorney, Agent, or Firm* — Davis Wright Tremaine LLP

(57) ABSTRACT

In various examples, end of speech (EOS) for an audio signal is determined based at least in part on a rate of speech for a speaker. For a segment of the audio signal, EOS is indicated based at least in part on an EOS threshold determined based at least in part on the rate of speech for the speaker.

31 Claims, 14 Drawing Sheets

(56) References Cited

U.S. PATENT DOCUMENTS

| | | | |
|---|---|---|---|
| 2002/0111812 A1* | 8/2002 | Buchholz | H04J 3/0632 704/278 |
| 2002/0116189 A1* | 8/2002 | Yeh | G10L 17/08 704/E17.008 |
| 2003/0158732 A1* | 8/2003 | Pi | G01S 13/933 704/E15.04 |
| 2006/0149558 A1* | 7/2006 | Kahn | G10L 15/063 704/278 |
| 2007/0185704 A1* | 8/2007 | Yoshimura | G10L 21/04 704/E15.045 |
| 2008/0095384 A1* | 4/2008 | Son | G10L 25/87 704/E11.005 |
| 2009/0313016 A1* | 12/2009 | Cevik | G10L 15/22 704/E15.001 |
| 2015/0206544 A1* | 7/2015 | Carter | G10L 15/04 704/235 |
| 2016/0358598 A1* | 12/2016 | Williams | G10L 17/02 |
| 2018/0090127 A1* | 3/2018 | Hofer | G10L 15/07 |
| 2018/0330718 A1 | 11/2018 | Hori et al. | |
| 2019/0279614 A1* | 9/2019 | Ye | G10L 15/187 |
| 2020/0005765 A1 | 1/2020 | Zhou et al. | |
| 2020/0074983 A1* | 3/2020 | Yu | G10L 15/16 |
| 2020/0118547 A1* | 4/2020 | Weng | G10L 15/16 |
| 2020/0160871 A1 | 5/2020 | Wada | |
| 2020/0213457 A1 | 7/2020 | Takahashi et al. | |
| 2020/0302913 A1* | 9/2020 | Marcinkiewicz | G06F 40/40 |
| 2020/0388283 A1* | 12/2020 | Tang | G10L 15/26 |
| 2020/0410985 A1* | 12/2020 | Chen | G10L 15/22 |
| 2021/0020181 A1 | 1/2021 | Gorny et al. | |
| 2021/0133577 A1 | 5/2021 | Srinivasan et al. | |
| 2021/0358490 A1* | 11/2021 | Vaidya | G10L 15/02 |
| 2021/0370188 A1* | 12/2021 | Thomas | A63F 13/77 |

OTHER PUBLICATIONS

Chang et al., "Joint Endpointing and Decoding with End-to-End Models," International Conference on Acoustics, Speech and Signal Processing, May 12, 2019, 5 pages.

Higuchi et al., "Mask CTC: Non-Autoregressive End-to-End ASR with CTC and Mask Predict," Aug. 17, 2020, 5 pages.

International Search Report and Written Opinion for Application No. PCT/US2022/014421, dated May 19, 2022, filed Jan. 28, 2022, 15 pages.

IEEE, "IEEE Standard 754-2008 (Revision of IEEE Standard 754-1985): IEEE Standard for Floating-Point Arithmetic," Aug. 29, 2008, 70 pages.

Shannon et al., "Improved End-of-Query Detection for Streaming Speech Recognition," Interspeech, Aug. 20-24, 2017, 5 pages.

Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

Pirch et al., "Libfvad," retrieved from https://github.com/dpirch/libfvad, May 1, 2018, 3 pages.

* cited by examiner

SPEAKER ADAPTIVE END OF SPEECH DETECTION FOR CONVERSATIONAL AI APPLICATIONS

BACKGROUND

Audio data is captured for a variety of different purposes, such as providing voice control or speech-based interactions with various devices. Unfortunately, detecting the appropriate elements of speech in captured audio can prove challenging, particularly for devices with limited resources. In particular, errors in detecting the start of speech and the end of speech by users may lead to errors, inaccuracies, and delays when processing the captured audio data for the various different purposes. Previous solutions risk poor results and high latency for end of speech detection.

BRIEF DESCRIPTION OF THE DRAWINGS

Various techniques will be described with reference to the drawings, in which.

DETAILED DESCRIPTION

Figure 1:
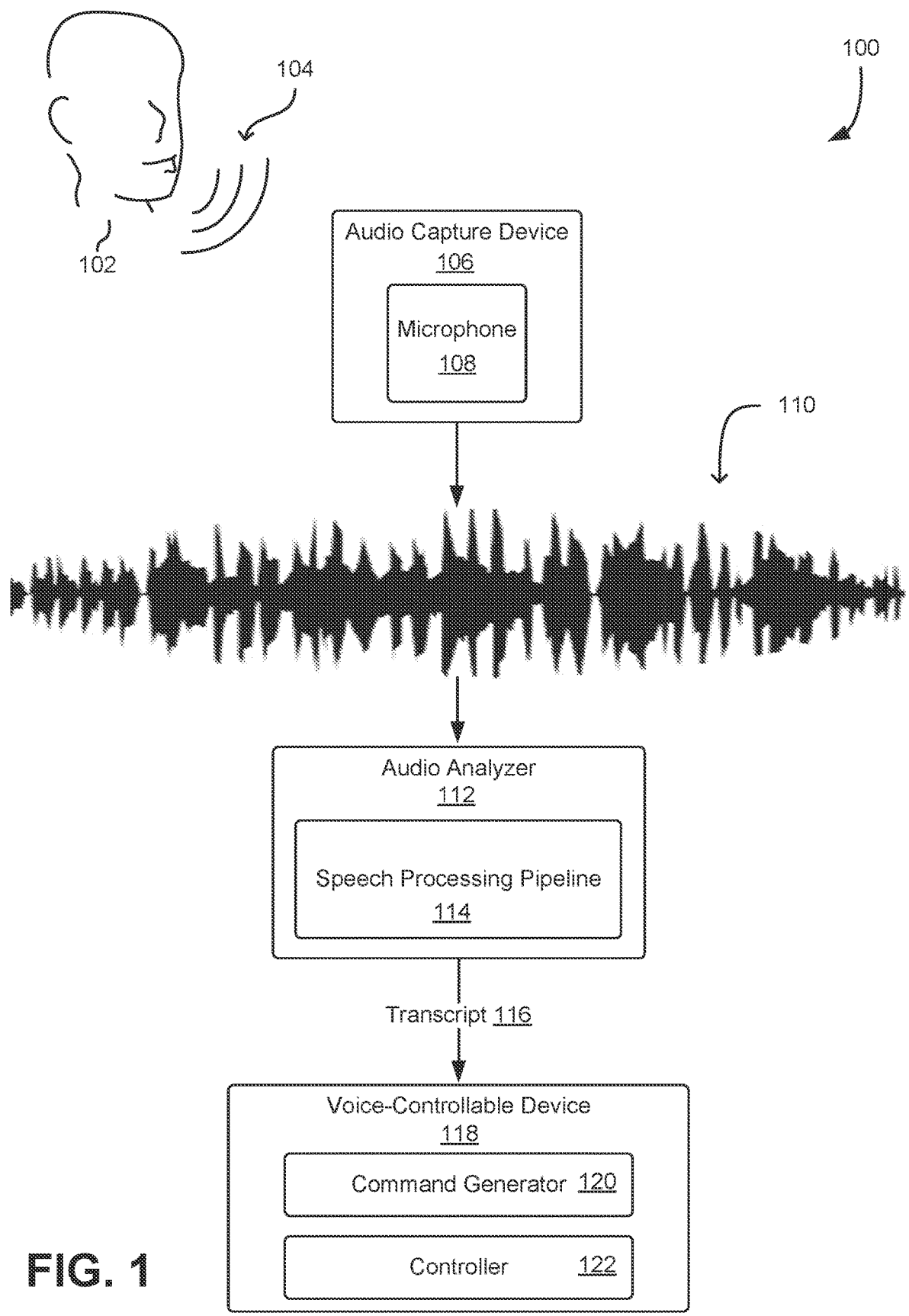
FIG. 1 illustrates a system for analyzing audio data, in accordance with at least one embodiment.

Embodiments of the present disclosure relate to speaker adaptive end of speech (EOS) detection. Systems and methods are disclosed that detect the start of speech (SOS) and the EOS based at least in part on a particular speaker's rate of speech.

In contrast to conventional systems, such as those described above, dynamically adapting SOS and EOS detection based at least in part on information obtained about the particular speaker (e.g., rate of speech) reduces latency and increases accuracy of SOS and EOS detection. In the present disclosure, a speaker adaptive EOS detector automatic speech recognition based at least in part on connectionist temporal classification (CTC) is described. In various embodiments, an EOS threshold indicates a minimum duration of silence detected in audio data to flag as EOS. In at least one embodiment, an EOS window length can be specified that defines a sliding window size for EOS detection, and the EOS threshold that can be used to flag a portion of a transcript or time interval as an EOS when a percentage of blank symbols in the sliding window meets or exceeds the EOS threshold. For example, with a window size of 500 ms and an EOS threshold set to 95%, an output string of the CTC for a particular window with at least 95% blank spaces would be flagged by an EOS detector, as described in greater detail below, as EOS.

To determine the EOS threshold for a particular speaker, intervals between successive words (e.g., inter-word time) is calculated based at least in part on the output of the CTC as described in greater detail below. In one example, the EOS threshold is calculated as a function of a set of inter-word times based at least in part on a string of characters outputted by the CTC. When performing automatic speech recognition using speaker adaptive EOS, a certain number of words spoken by the particular speaker may be captured prior to estimating a rate of speech for the particular speaker. In one example, a set of twenty-five inter-word times is obtained prior to calculating the rate of speech.

As described in greater detail below, the rate of speech may be a measure of a speed at which words are produced, which can be defined in numerous ways, such as the average of the set of inter-word times, the maximum value of the set of inter-word times, the minimum value of the set of inter-word times, the variance of inter-word times, other functions of the set of inter-word times, and/or a combination thereof. In various embodiments, once the rate of speech is determined, the EOS threshold is adapted or otherwise modified for the particular speaker. Similarly, the rate of speech can be used to adapt or otherwise modify the SOS threshold. In various embodiments, the EOS threshold and/or the SOS threshold are modified periodically or aperiodically based at least in part on the rate of speech.

Once the EOS threshold and the SOS threshold are determined for a particular speaker, in various embodiments, the EOS threshold and the SOS threshold are used to determine the SOS and the EOS for audio data obtained as part of an automatic speech recognition process. As described in greater detail below, input audio may be processed by various components (e.g., feature extractor and neural acoustic model) prior to being inputted into the CTC. The CTC, in various embodiments, provides a probability distribution for possible characters, or samples, contained in that audio frame or time step of an audio input. In one example, these characters may include any appropriate alphanumerical character, as well as potentially one or more special characters such as blanks to represent time steps or audio frames in which no other character is detected. In various embodiments, in order to determine a string of characters for processing by the EOS detector, a most probable character out of a set of possible characters is selected based at least in part on the probability distribution indicated in the CTC.

The EOS detector, in an embodiment, determines a percentage of blank symbols within the string of characters for a particular window of a sliding window. In one example, for a set of time steps within the string of characters, the EOS detector determines if the current state is a speech state (e.g., a current character indicates speech) or a non-speech state (e.g., the current indicates a blank and/or silence). The EOS detector may then determine if the percentage of blank symbols (e.g., non-speech states) satisfies the EOS threshold. If, for example, the EOS threshold is satisfied then the EOS may be flagged and a decoder, as described in greater detail below, generates a transcript associated with the audio input.

In at least one embodiment, a microphone 108 of an audio capture device 106 can capture an audio signal, which may include speech 104 uttered by at least one person 102. In various embodiments, the microphone 108 includes an instrument for converting sound waves into electrical energy variations which may then be amplified, transmitted, or recorded for use in various embodiments described in greater detail below. In one example, the microphone 108 is included as part of a headset worn by user 102, where the output of the microphone 108 is provided as an input to the audio capture device 106. In another example, the microphone 108 is part of (e.g., integrated with) the audio capture device 106 that is positioned a distance from user 102, where the audio capture device 106 may include, or be part of, a computing device, Internet or Things (IoT) device, a smart speaker, mobile phone, computers, or other device capable of capturing or receiving audio signals or data. In various embodiments, the audio capture device 106 is integrated into another device such as a navigation system, vehicle, security camera, or other system.

In addition, the audio capture device 106 may include networking and/or processing functionality. In one example, the audio capture device 106 includes a networking interface (e.g., WiFi radio) to transmit data to an audio analyzer 112. In various embodiments, the audio analyzer 112 includes executable code or other instructions (e.g., source code stored in memory) that, when executed by a process of a computing device, causes the computing device to perform various operations described in the present disclosure such as generating a transcript 116 based at least in part on speech 104. For example, the audio capture device 106 includes a memory and processor used to execute the audio analyzer 112 or perform other operations described in the present disclosure. In yet other embodiments, the audio analyzer 112 comprises a service provided by a computing resource service provider (e.g., cloud computing service provider). In such embodiments, the audio analyzer 112 is executed by one or more servers (e.g., using virtual machines or container instances) in a data center to perform the operations described in the present disclosure. In one example, the audio capture device 106 transmits, over a network, one or more audio signals 110 to a service endpoint associated with the audio analyzer 112.

In at least one embodiment, speech 104 uttered by the user 102 may be speech that is to be transcribed or otherwise converted into text for any of a number of appropriate purposes. For example, the speech 104 is transcribed to text for use by a virtual assistant or other application. In another example, the speech 104 is analyzed and converted to text commands that can be used to provide instructions or requests to at least one voice-controllable device 118. In at least one embodiment, a voice-controllable or voice-activated device 118 can include a device that is able to take a physical action, such as a vehicle, or a computing device including software that is able to execute instructions corresponding to determined voice commands or requests.

In at least one embodiment, audio capture device 106 can capture the one or more audio signals 110 using microphone 108, which can be passed to the audio analyzer 112. As described above, the audio analyzer 112 may be on the same device as audio capture device 106, or may be on a separate device, such as a remote device available over a wireless connection or a remote server available over a network connection. Furthermore, in various embodiments, the audio analyzer 112 includes a speech processing pipeline 114 which, taking the audio signals 110 as an input, analyzes the audio signals 110 and generates one or more transcripts 116, or other text generated based at least in part on the audio signals, as discussed in more detail below. In various embodiments, the speech processing pipeline 114 includes executable code or other instructions (e.g., source code stored in memory) that, when executed by a process of a computing device, causes the computing device to perform various operations described in the present disclosure (e.g., taking the audio signals 110 as an input, analyzing the audio signals 110, and generating one or more transcripts 116). In at least one embodiment, the transcript 116 is provided to the voice-controllable device 118, which can perform one or more actions based at least in part upon text contained in the transcript 116.

In various embodiments, the voice-controllable device 118 includes a command generator 120 that can analyze text included in the transcript 116 and generate a command, based at least in part on the text that is executable by a controller 122 (or other application or component) of the voice-controllable device 118. In various embodiments, the command generator 120 and controller 122 includes executable code or other instructions (e.g., source code stored in memory) that, when executed by a process of a computing device (e.g., the voice-controllable device 118), causes the computing device to perform various operations described in the present disclosure such as generating a command based at least in part on the transcript 116 and causing the computing device to execute the command. For example, the command is provided to adjust an operation of a device, robot, or vehicle. In another example, the command is provided to return information such as through a search engine, database query, or other operation of an application. In yet other embodiments, the transcript 116 is instead stored for subsequent usage or analysis (e.g., storing the transcript 116 in a database). As mentioned above, the voice-controllable device 118 may be integrated within the same device as the audio analyzer 112, and may also include the audio capture device 106, or alternatively may be on separate devices able to communicate over at least one wired or wireless connection to other components described in the present disclosure. In one example, the voice-controllable device 118 is registered with a service of a computing resource service provider to receive, over a network, the transcript 116 from the audio analyzer 112 (implemented as the service of the computing resource service provider).

In at least one embodiment, the speech processing pipeline 114 includes various components (e.g., software and/or hardware components executing source code) such as those described in greater detail below in connection with FIG. 2. In various embodiments, the speech processing pipeline 114 determines a rate of speech of the user 102 based at least in part on the audio signal 110. As described in greater detail below, the speech processing pipeline 114, in an embodiment, utilizes an end of speech (EOS) threshold that is modified based at least in part on the rate speech of the user 102 once a sufficient number of inter-word times have been determined. As described in greater detail below, the speech processing pipeline 114 may use a connectionist temporal classification (CTC) function or other algorithm to generate a string of characters representing the speech 104 captured in the audio signal 110. In an embodiment, the speech processing pipeline 114 then determines a set of inter-word intervals (e.g., time between spoken words in the speech 104) based at least in part on blank characters included in the string of characters. The set of inter-word intervals may then be used as an input to a function to modify and/or replace the EOS threshold. As described in greater detail below, the EOS threshold, in an embodiment, is used by an EOS detector to flag the EOS signaling that the transcript 116 can be generated and/or provided to the voice-controllable device 118.

Figure 2:
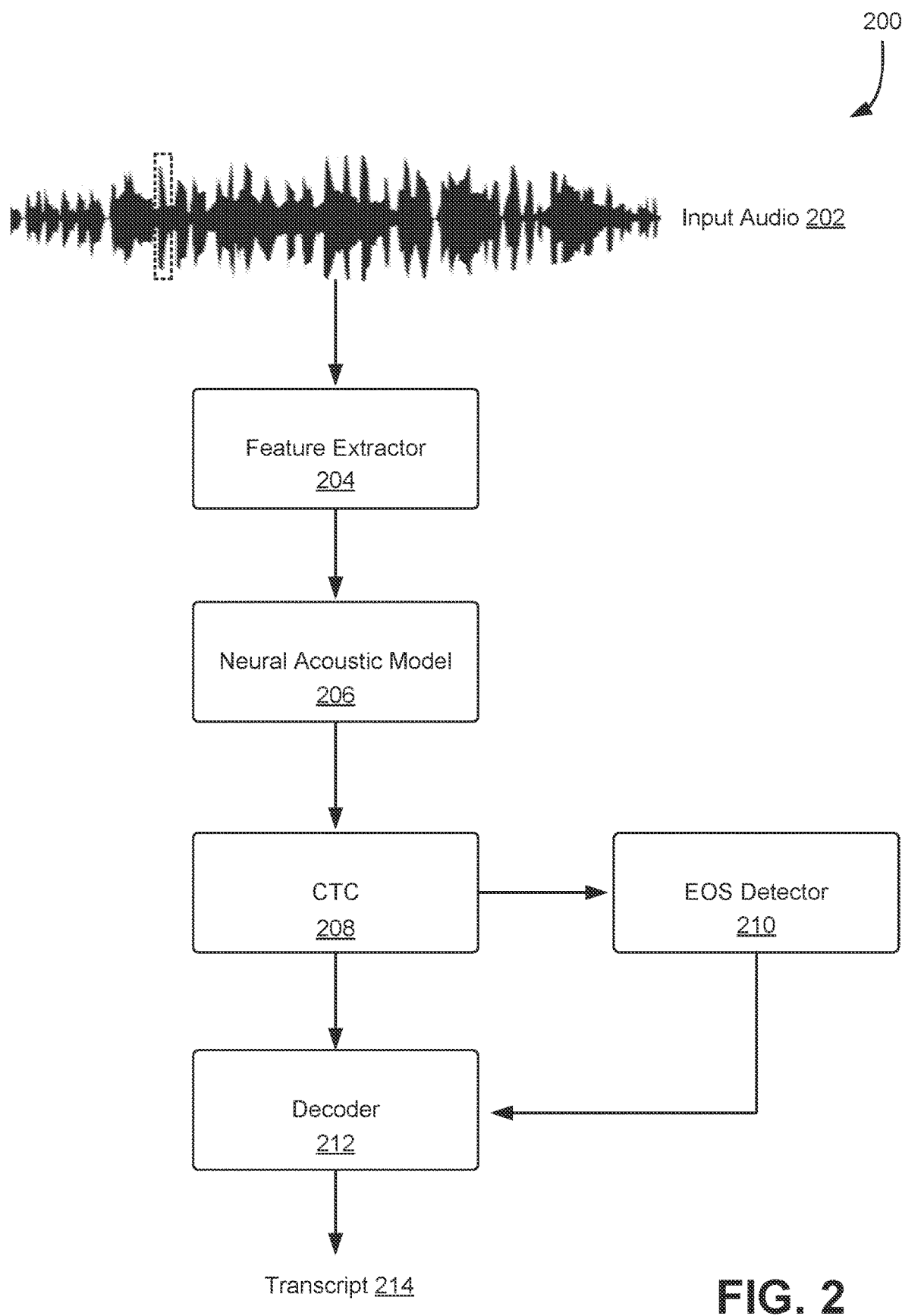
FIG. 2 illustrates an audio processing pipeline, in accordance with at least one embodiment.

FIG. 2 illustrates an embodiment in which an input audio 202 captured by a microphone, or otherwise obtained, is provided as an input to a speech processing pipeline 200 to generate a transcript 214. For example, the input audio 202 is captured by the audio capture device 106 as described above in connection with FIG. 1. In various embodiments, the speech processing pipeline 200 and components thereof (e.g., feature extractor 204, neural acoustic model, CTC, EOC detector 210, and decoder 212) include executable code or other instructions (e.g., source code stored in memory) that, when executed by a process of a computing device (e.g., the audio capture device 106 as described above in connection with FIG. 1), causes the computing device to perform various operations described in greater detail below. Furthermore, as described above, the transcript may include text or other information suitable for use by the voice-controllable device 118 as described in connection with FIG. 1.

The components illustrated in FIG. 2 may be performed on a single computing device or a plurality of computing devices including cloud computing devices as described in the present disclosure. For example, a local device (e.g., cell phone, smart speaker, smart television, or other device capable of capturing audio) captures the input audio 202 and provides the input audio 202 to the speech recognition pipeline 200 which is executed as a service of a computing resource service provider as described in greater detail below. In general, the components illustrated in FIG. 2 may be executed by a computing device, clouding computing devices, or a combination thereof. Generally, operations described herein can be distributed for performance among a set of devices in different ways in accordance with different embodiments.

In an embodiment, the input audio 202 is provided to a feature extractor 204. The feature extractor 204, in various embodiments, includes at least one neural network trained to accept the input audio 202 as input and output features that are representative of a content of the input audio 202, such as may correspond to one or more patterns recognized in one or more audio frames of the input audio 202. In one example, the feature extractor 204 includes a deep convolutional neural network (CNN) trained to extract features from the input audio 202. In at least one embodiment, feature extractor 204 can perform tasks such as signal normalization, windowing, and generation of an audio feature spectrogram, such as a mel-spectrogram.

In at least one embodiment, a set of features in a frequency domain for a given audio frame of the input audio 202 (e.g., represented by a mel-spectrogram) may be passed to a neural acoustic model 206 or other model useful for automatic speech recognition. For example, the neural acoustic model 206 can generate a representation of a relationship between a received audio signal (e.g., the input audio 2020) and phonemes or other linguistic units that make up speech. Furthermore, in various embodiments, the neural acoustic model 206 is trained at least in part by learning to create statistical representations of sounds that make up individual words.

In at least one embodiment, an output of the neural acoustic model 206 is provided to a connectionist temporal classification (CTC) function 208 to, given these extracted audio features, provide a probability distribution for possible characters, or samples, contained in a particular audio frame or time step of the input audio 202. In various embodiments, the characters outputted by the neural acoustic model 206 include any appropriate alphanumerical character (e.g., A-Z), as well as potentially one or more special characters such as blanks to represent time steps or audio frames in which no other character is detected. In other words, the blank character, in an embodiment, represents a time step or audio frame in which speech was not detected (e.g., the speaker was silent such as a pause between words). In at least one embodiment, the neural acoustic model 206 can be any appropriate acoustic model, such as a Jasper model from NVIDIA Corporation or other deep convolutional neural networks (CNNs). For example, a Jasper network can be used in an automatic speech recognition (ASR) pipeline (e.g., the speech processing pipeline 200) that includes a deep CNN composed from a series of convolutional layers, as well as batch normalization, ReLU, and dropout layers.

For training purposes for tasks such as speech recognition, in at least one embodiment, a dataset of audio clips and corresponding transcripts is provided to the speech processing pipeline 200 described in FIG. 2. However, in some embodiments, the speech processing pipeline 200 is executed without an alignment between audio clips and transcripts (e.g., without training data). In at least one embodiment, such a dataset can make training a DNN-based speech recognition model difficult due at least in part to this lack of alignment data. However, in various embodiments, the connectionist temporal classification (CTC) function 208 can be used to attempt to make up for this lack of alignment data. For example, given an audio sequence $X$ $[x_1, x_2, \ldots x_T]$ and transcript sequence $Y$ $[y_1, y_2, \ldots y_T]$, the CTC function 208 can be used with output from the neural acoustic model 206 to obtain an accurate mapping between this audio sequence and the transcript sequence. In at least one embodiment, CTC function 208 for a given audio frame $x_i$ provides a probability distribution over all $y_i$ values. The probability distribution outputted by the CTC function 208 for each audio frame of the input audio 202, in various embodiments, is provided as input to a decoder 212 for producing a transcript 214. Furthermore, in at least one embodiment, this probability distribution for each audio frame is also be provided as input to an end of speech (EOS) detector 210, which can flag a particular time step or audio frame an EOS.

In at least one embodiment, the EOS detector 210 can be used to detect a start of speech (SOS) and an EOS segment for output of an automatic speech recognition (ASR) model based on the output of the CTC function 208. In an embodiment, the CTC function 208 utilizes a defined number of characters (e.g., 29 characters) where those characters include 26 characters of this English language (and/or numbers or other characters for other languages) and a set of other characters each indicating a different grammatical and/or functional aspect, such as a space character for word separation, an apostrophe symbol, and a blank symbol used to indicate that no other character was detected for a given audio frame. As described above, a blank symbol can represent silence, and a probability of blank characters can be used for EOS detection. In at least one embodiment, EOS detector 210 can be integrated with CTC function 208 so that no additional components are needed for speech processing pipeline 200.

In various embodiments, the EOS detector 210 or other components of the speech processing pipeline 200 determines or otherwise modifies the EOS threshold based on a rate of speech of a speaker determined. The rate of speech may be determined based at least in part on the input audio 202 and/or a plurality of different audio signals provided to the speech processing pipeline 200. Furthermore, in an embodiment, the speech processing pipeline 200 includes an initial EOS threshold. In one example, before the rate of speech can be determined for a particular speaker, the EOS threshold is set at (for example and without limitation) 500 blank characters (obtained from the CTC function 208) for a sliding window of size X (e.g., 500 milliseconds). In other examples, the EOS threshold is described as a percentage of blank characters (e.g., 90%) over the sliding window of size X.

In various embodiments, once a sufficient number of inter-word intervals has been calculated, the EOS threshold is modified based at least in part on the values of the inter-word intervals. In one embodiment, the number of inter-word intervals is fixed (e.g., 25 inter-word intervals are required to calculate the EOS threshold). In yet other embodiments, the number of inter-word intervals required before modifying or generating a new EOS threshold is dynamically determined. For example, if the rate of speech as represented by a set of inter-word intervals is consistent (e.g., the variance between the inter-word intervals is low), the EOS threshold is modified prior to reaching the fixed value described above. Similarly, if there is a high variance, additional inter-word intervals may be collected beyond the fixed value described above.

In various embodiments, once a sufficient set of inter-word intervals is obtained (e.g., based at least in part on the output of the CTC function 208) the initial EOS threshold may be modified or a new EOS threshold may be generated. In one example, the EOS threshold is set to the maximum value (e.g., the longest amount of time between spoken words) of the set of inter-word intervals. Furthermore, in various embodiments, the EOS threshold is determined as a function of the set of inter-word intervals. For example, the EOS threshold may be calculated based at least in part on the mean, variance, mode, or other function of the values of the set of inter-word intervals. In at least one embodiment, an algorithm using these values can be given by:

```
interword_times = update_
  interword_times(ctc_output_
  string, interword_times)
SOS_threshold, EOS_
  threshold = calculate_
  dynamic_threshold
  (interword_times)
detect_speech_segments
  (ctc_output_string) {
  segments = { }
  start = 0
  for each timestep in string {
    If (state == speech) {
      Use EOS window length and
      EOS_threshold to detect EOS
      If (EOS) {
        State = non-speech
        segments.add(start,
        current_timestep)
      }
    } else if (state = non-speech) {
      Use SOS window length and
      SOS_threshold to detect SOS
      If (SOS) {
        state = speech
        start = current_timestep
      }
    }
  }
}
```

Figure 3:
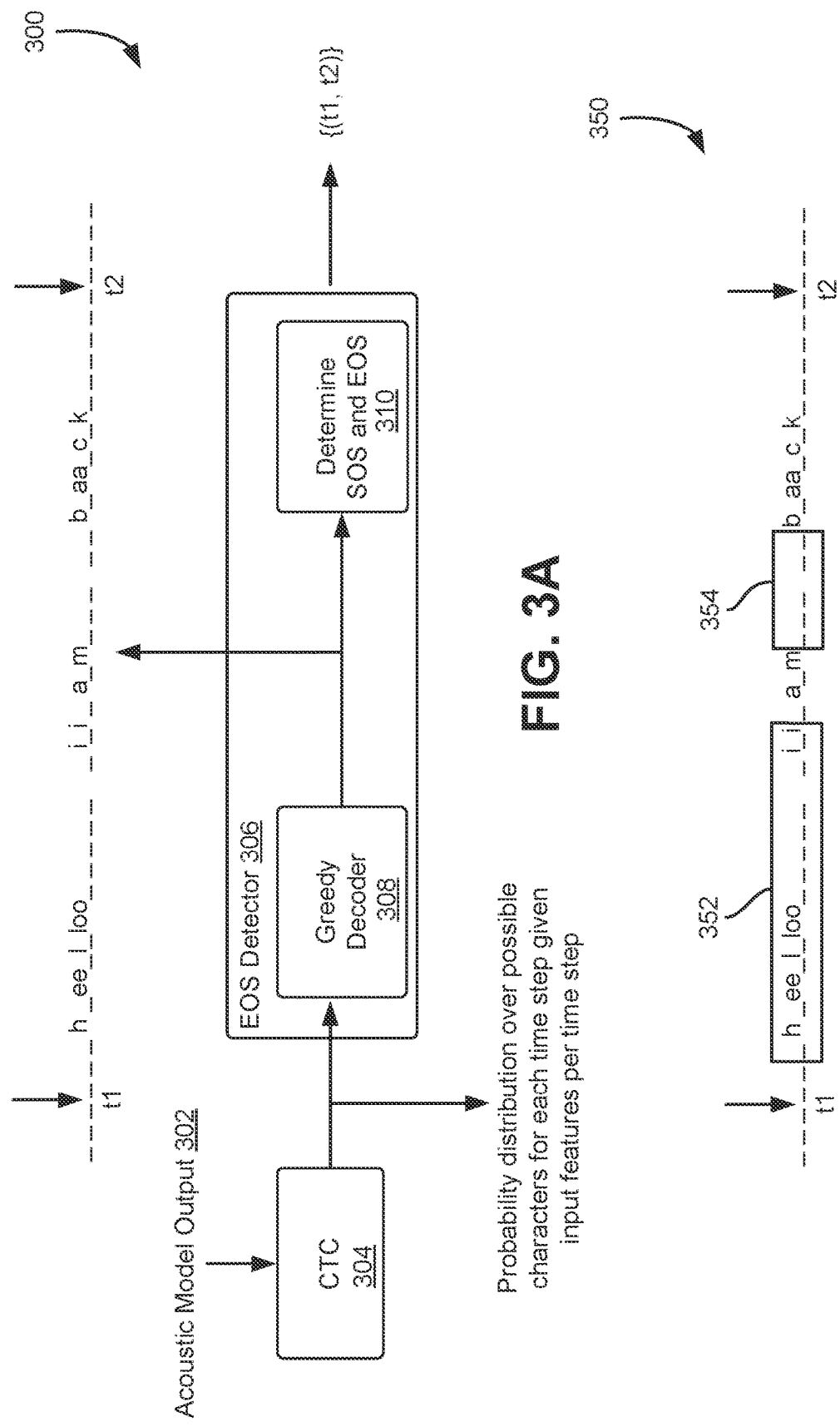
FIGS. 3A and 3B illustrate an approach to end of speech detection, in accordance with at least one embodiment.

FIGS. 3A and 3B illustrate a portion of a speech processing pipeline 300 in which various components of an EOS detector 306 process the output of a CTC function 304. In at least one embodiment, the EOS detector 306 includes a greedy decoder 308 and a component 310 to determine (e.g., flag) start of speech (SOS) and/or end of speech (EOS). As described above in connection with FIG. 2, an acoustic model output 302 is provided as input to the CTC function 304, which in turn outputs a probability distribution over possible characters for each time step. For example, the output of the CTC function 304 includes a probability distribution described as n×1×c, where n is a number of time steps and c is a number of entries in a vocabulary. In at least one embodiment, probability distribution data generated by the CTC function 304 is provided as input to the greedy decoder 308. The greedy decoder 308, in an embodiment, selects the most probable character out of the set of possible characters (e.g., the characters indicated in the probability distribution data) based at least in part on the probability distribution (e.g., 1×c). In one example, an Argmax decoder is applied to each time step, such that an output of the greedy decoder 308 will be a string of n characters, where the selected character has the highest probability as indicated in the probability distribution data. In at least one embodiment, an output 350 of the greedy decoder 308 (e.g., Argmax function) is illustrated in FIG. 3B, where this output includes a string which includes alphanumeric characters and blank symbols represented by underscores FIGS. 3A and 3B.

In at least one embodiment, the strings illustrated in FIGS. 3A and 3B (e.g., the output 350) is time aligned with a corresponding audio input based at least in part on the output of CTC function 304. As illustrated in FIG. 3A, in an embodiment, the string is provided as input to the component 310 to determine EOS and/or SOS. For example, if EOS or SOS is determined for the output 350, the EOS detector 306, as described above, flags the time step for a decoder of a speech recognition pipeline indicating that a transcript can be generated. In at least one embodiment, the component 310 can also calculate a start of speech (SOS) value or time. For example, an output of the EOS detector 306 includes a start time and an end time for a given speech segment of an input audio signal. In various embodiments, a segment (e.g., EOS segment) includes various portions of the audio signal including a time step, audio frame, sliding window, or other logical or physical portion of the audio signal.

In at least one embodiment, detecting of EOS and/or SOS is performed using a sliding window 352 on the output 350 of the greedy decoder 308. For example, the sliding window 352 includes a number of time steps X (e.g., 25) where each time step represents an interval of time (e.g., 20 milliseconds). As described above, a determination of EOS can be made based at least in part on a percentage of blank symbols (illustrated as underscores in FIGS. 3A and 3B) that are included within the sliding window 352 for any time step and/or range of time steps. In one example, each time step can be classified as speech or non-speech (e.g., as indicated in the algorithm described above in connection with FIG. 2), with blank symbols representing a period of non-speech.

Furthermore, in this example, time steps classified as speech may have another non-blank symbol (e.g., an alphanumeric character) assigned to indicate speech for that time step. In an embodiment, the CTC function 304 returns the most probable character for each time step.

As illustrated in FIG. 3B, an inter-word interval 354, in an embodiment, includes a number of time steps or audio frames represented by the blank symbol between alphanumeric characters. In at least one embodiment, separate window lengths and thresholds (e.g., EOS threshold and SOS threshold) can be used to provide finer control over segment detection, including determinations of both SOS and EOS. For example, various parameters such as SOS window length, specifying a sliding window size for start of speech detection, and an SOS threshold value, which can be used to specify that a SOS can be flagged if a percentage of blank symbols within that sliding window falls below the SOS threshold.

In another example, an EOS window length can be specified that defines a sliding window size for EOS detection, and an EOS threshold that can be used to flag an EOS when a percentage of blank symbols in this sliding window meets or exceeds this EOS threshold. In various embodiments, an EOS window size is set to 500 milliseconds and an EOS threshold is set to 95% based at least in part on a set of inter-word intervals. Furthermore, the set of inter-word intervals, in an embodiment, is used to modify the SOS sliding window size, SOS threshold, EOS sliding window size, and EOS threshold. In this manner the EOS detector 306 may allow for a tighter threshold for start of speech, to ensure that no speech is missed, and for end of speech, where including additional non-speech may not be as critical and cause delay in generating a response for the user. In at least one embodiment, an algorithm using these values can be given by:

```
For each timestep {
    If (speech started) {
        Use EOS window length and
        threshold to detect EOS
    } else {
        Use SOS window length and
        threshold to detect SOS
    }
}
```

Furthermore, in various embodiments, an acoustic model can be trained to detect noise as silence, or non-speech, to improve EOS detection. In one example, this can include generating training data that includes different types and levels of noise, such that character probability detection is more accurate in the presence of different types of noise (e.g., road noise, background conversation, construction, wind, or other forms of sound not generated directly by the act of the speaker speaking). In at least one embodiment, this can include mixing different types and levels of noise with clean audio signals for generating training data. In such embodiments, the CTC function 304 is used during training to align audio files with their transcripts. In addition, in various embodiments, the output of the CTC function 304 is decoded to generate a final transcript.

Furthermore, the speech recognition pipeline described in the present disclosure can be robust to challenging acoustic conditions. For example, the speech recognition pipeline can handle extremes including low gain and noisy environments. In various embodiments, the speech recognition pipeline utilizes a simple and computationally efficient algorithm, with little if any additional cost for an EOS detector, as such a detector can utilize output from a neural acoustic model and the CTC function 304, which may already exist within the speech recognition pipeline 300. As a result, the EOS threshold, in various embodiments, is recalculated periodically or aperiodically. In one example, the set of inter-word intervals is continuously calculated and for every 25 inter-word intervals the EOS threshold is recalculated and/or updated. In at least one embodiment, an EOS detector can utilize a neural acoustic model that gets trained as per a target environment, such as in a home, car, office, or retail establishment.

Figure 4:
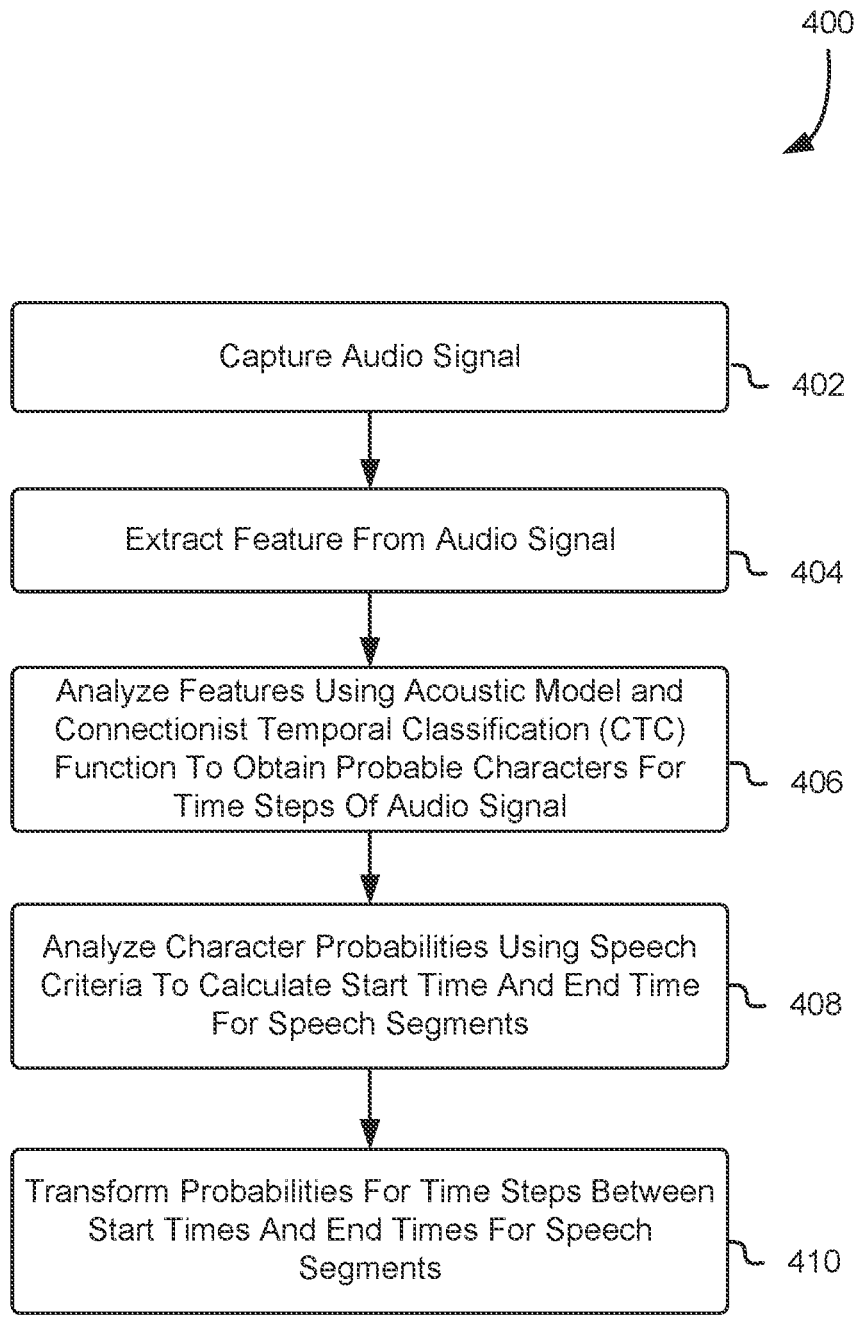
FIG. 4 illustrates a process for analyzing speech in an audio signal, in accordance with at least one embodiment.
Figure 5:
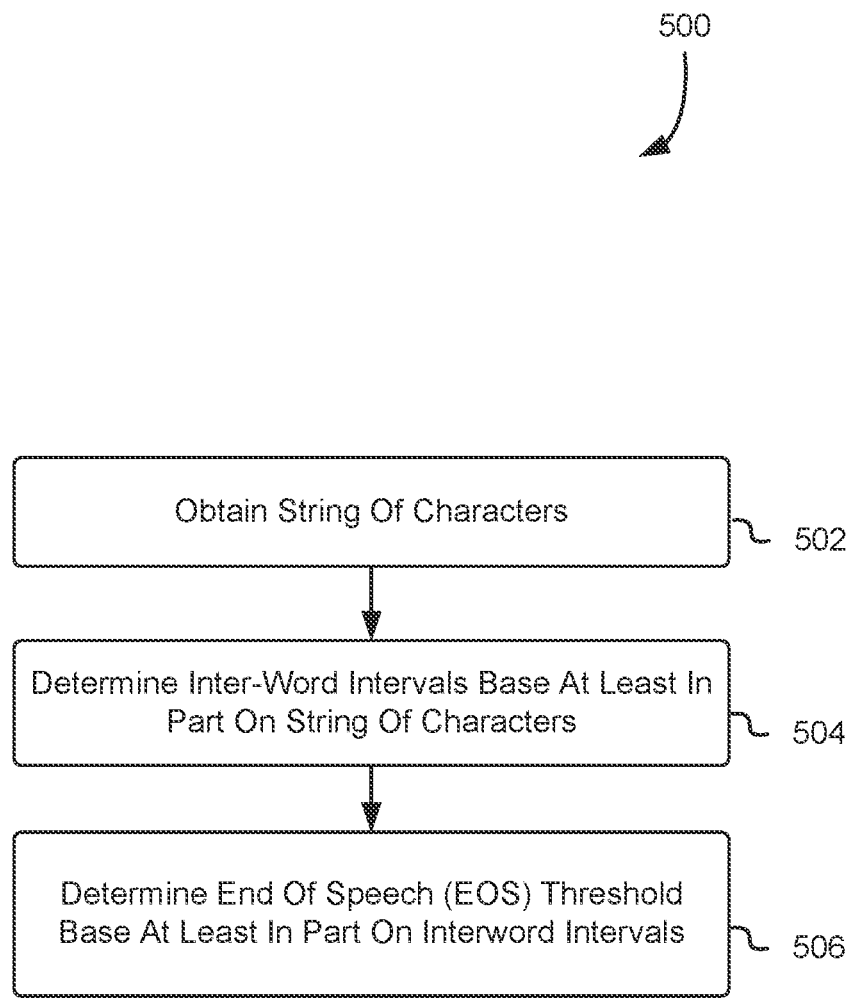
FIG. 5 illustrates a process determining a speaker adaptive end of speech and/or start of speech threshold, in accordance with at least one embodiment.
Figure 6:
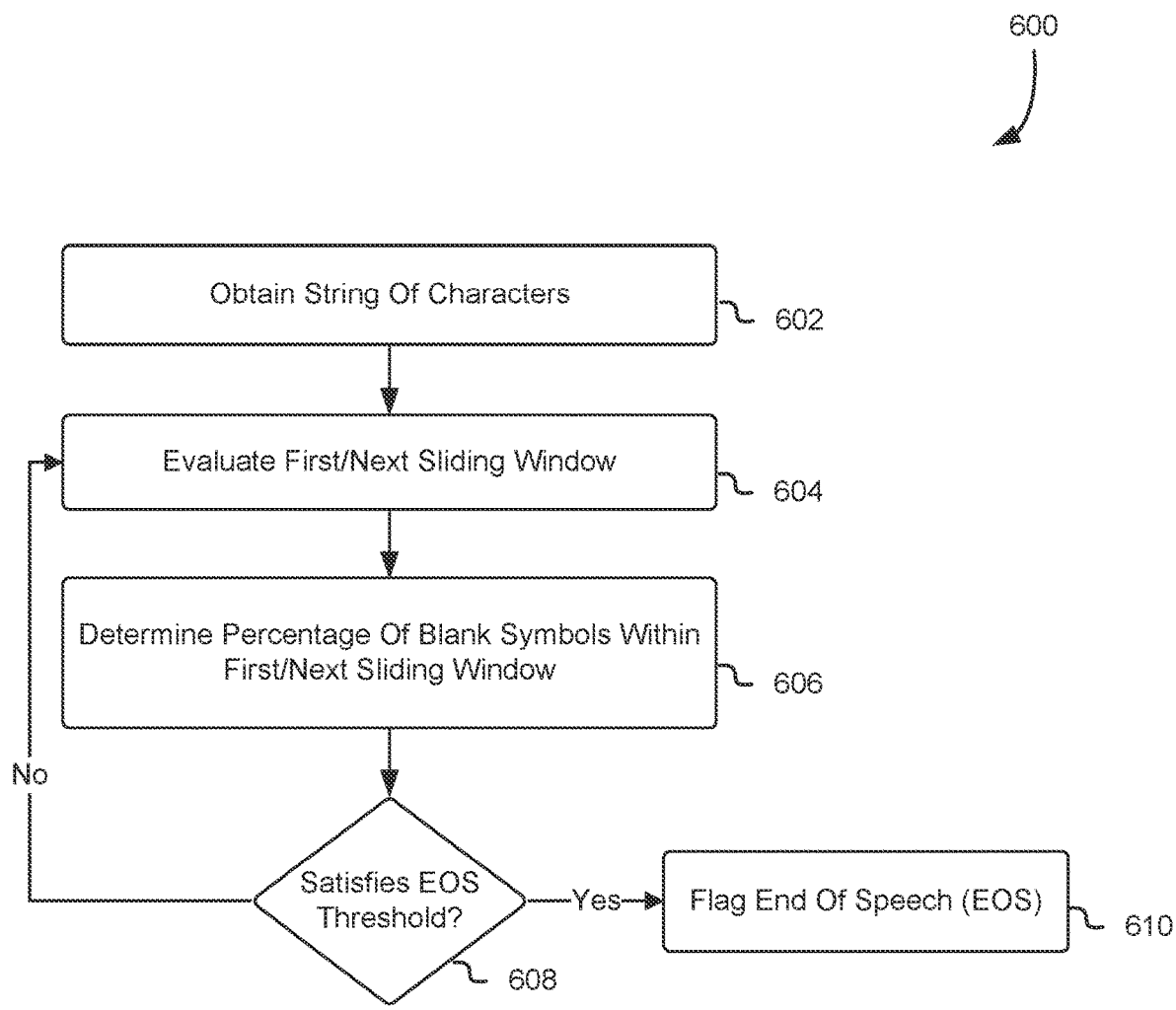
FIG. 6 illustrates a process flagging an end of speech based at least in part on a speaker adaptive end of speech threshold, in accordance with least one embodiment.

Now referring to FIGS. 4, 5, and 6, each block of methods 400, 500, and 600 described herein, comprises a computing process that may be performed using any combination of hardware, firmware, and/or software. For instance, various functions may be carried out by a processor executing instructions stored in memory. Each of the methods may also be embodied as computer-usable instructions stored on computer storage media. The methods may be provided by a standalone application, a service or hosted service (standalone or in combination with another hosted service), or a plug-in to another application or service, to name a few. In addition, method 400 is described, by way of example, with respect to the speech recognition pipeline of FIG. 2. However, these methods may additionally or alternatively be executed by any one system, or any combination of systems, including, but not limited to, those described herein. In addition, operations of the methods described in FIGS. 4, 5, and 6 may be omitted, performed in different orders, performed in parallel, or performed in a combination of serial and parallel. In general, the operations described below in connection with FIGS. 4, 5, and 6 may be performed by a single device or a plurality of devices communicating over a network or other communications channel.

FIG. 4 illustrates a method 400 for determining an end of a speech segment in an audio signal, in accordance with various embodiments of the present disclosure. As described above, the method 400, in an embodiment, is performed by the audio capture device 106 described above in connection with FIG. 1. In other embodiments, other devices (e.g., cloud computing resources, virtual machines, virtual processors, edge computing devices, etc.) perform all or some of the operations described below. For example, the audio capture device records the audio signal and transmits the audio signal or a portion thereof (e.g., a downsampled or otherwise processed version of the audio signal) to a cloud computing device, virtual machine or process, or edge computing device, etc., to perform all or some of the operations described above.

The method 400, at block 402, includes capturing an audio signal. In an embodiment, the audio signal is captured using a microphone (e.g., of an audio capture device) to capture an audio signal representative of human speech. For example, a smart speaker capturing audio signals in response to a wake word and transmitting the captured audio signal to a speech processing service implemented by a computing resource service provider. At block 404, a set of audio features are extracted from the audio signal. For example, the features include a frequency spectrum. At block 406, the features extracted from the audio signal are analyzed using a trained acoustic model and a connectionist temporal classification (CTC) function to determine probabilities of characters for individual frames or time steps of this audio signal. At block 408, the character probabilities outputted by the CTC function is analyzed using one or more speech criteria to calculate a start time and/or an end time for one or more speech segments contained within this audio signal. In at least one embodiment, this can be performed using an end of speech (EOS) detector that uses speech criteria including length of a sliding window and/or a percentage of blank characters predicted within the sliding window, for purposes of determining start and end of speech. Furthermore, in various embodiments, window size and percentage thresholds can differ for start and end time calculations. In block 410, a decoder can be used to transform the character probabilities between start and end times into transcripts for corresponding speech segments. In at least one embodiment, these transcripts may then be stored or provided to an intended recipient, such as a voice-controlled device that is enabled to act upon a command contained within a given speech segment. In an embodiment, block 404 through 410 are performed by the speech processing service implemented by the computing resource service provider.

FIG. 5 is a flow diagram showing a method 500 for determining an end of speech (EOS) threshold based at least in part on a rate of speech of a particular speaker, in accordance with some embodiments of the present disclosure. In an embodiment, the method 500 is performed by an audio capture device as described in the present disclosure. In yet other embodiments, the method 500 is performed as a component of a speech processing service implemented by a computing resource service provider. For example, a service of the computing resource service provider determines an EOS threshold using the method 500 and provides and/or updates the EOS threshold of an audio capture device to enable the audio capture device to improve performance and detection of EOS. Returning to FIG. 5, the method 500, at block 502, includes obtaining a string of characters. In various embodiments, a connectionist temporal classification (CTC) function generates, as an output, a probability distribution for characters based at least in part on the output of an acoustic model. For example, as described above, the CTC function outputs a probability distribution over possible characters for each time step given input features per time step of an audio signal. Furthermore, as described above, a component of a speech recognition pipeline (e.g., a greedy decoder) may utilize an algorithm to generate the string of characters based at least in part on the probability distribution outputted by the CTC.

In block 504, the system performing the method 500, determines a set of inter-words based at least in part on the string of characters. In various embodiments, the characters include a predefined alphabet in which an underscore or other symbol represents a portion of the audio signal without speech. In other words, the audio signal for a given time step represented by a blank symbol may include sound (e.g., background noise) but does not include a speech sound (e.g., a spoken word). In an embodiment, a plurality of consecutive blank symbols between words represented by a string of alphanumeric characters output by the CTC is counted as an inter-word interval. As described above, in an embodiment, a number of inter-word intervals (e.g., 25) are collected prior to determining the EOS threshold. However, in yet other embodiments, an EOS threshold can be determined once a first inter-word interval is determined. In such embodiments, the EOS threshold may be modified by subsequent inter-word intervals.

In block 506, the system performing the method 500, determines the EOS threshold based at least in part on the set of inter-word intervals. In various embodiments, the EOS threshold is a function of the values of the set of inter-word intervals. In one example, the EOS threshold is set to the mean value of the set of inter-word intervals. In yet another example, the EOS threshold is set to the maximum value of the set of inter-word intervals. Once the EOS threshold is determined, in various embodiments, the speech processing pipeline replaces an initial EOS with the EOS determined by the system performing the method 500. In various embodiments, the method 500 is used to determine a start of speech (SOS) threshold.

FIG. 6 is a flow diagram showing a method 600 for determining an end of speech (EOS) based at least in part on a rate of speech of a particular speaker, in accordance with some embodiments of the present disclosure. In various embodiments, the EOS threshold is determined using the method 500 as described above. In an embodiment, the method 600 is performed by an audio capture device as described in the present disclosure. In yet other embodiments, the method 600 is performed as a component of a speech processing service implemented by a computing resource service provider. For example, the method 600 is performed by an EOS detector (e.g., the EOS detector 210 as described in greater detail above) executed as a component of a speech processing pipeline implemented by a computing resource service provider using cloud computing devices.

The method 600, at block 602, includes obtaining a string of characters. In various embodiments, a connectionist temporal classification (CTC) function generates, as an output, a probability distribution for characters based at least in part on the output of an acoustic model. For example, as described above, the CTC function outputs a probability distribution over possible characters for each time step given input features per time step of an audio signal. Furthermore, as described above, a component of a speech recognition pipeline (e.g., a greedy decoder) may utilize an algorithm to generate the string of characters based at least in part on the probability distribution outputted by the CTC.

In block 604, the system performing the method 600, evaluates a first sliding window. As described above, a sliding window may include a plurality of time steps or audio frames. In one example, a 500 millisecond sliding window comprises twenty-five time steps, each time step having a duration of 20 milliseconds. Various different lengths for the sliding window may be used in connection with the method 600. Furthermore, the sliding window, in an embodiment, corresponds to a set of characters in the string of characters. For example, as described above in connection FIG. 3, the sliding window 352 comprises a substring of characters of the string of characters. In various embodiments, the sliding window starts a time 0 (e.g., the first time step) and includes a set of consecutive time steps or audio frames (e.g., from time 0 until time X).

In step 606, the system performing the method 600, determines a percentage of blank symbols within the first sliding window. In an embodiment, the percentage of blank symbols is determined by dividing the number of blank symbols in the sliding window by the total number of symbols within the sliding window. In other embodiments, for example where the sliding window size does not change, the percentage of blank symbols is determined by dividing the number of blank symbols by the length (e.g., the number of time steps or audio frames) of the sliding window.

In block 608, the system performing the method 600, determines if the EOS threshold has been satisfied based at least in part on the percentage of blank symbols determined in block 606. For example, if the percentage of blank symbols for the first sliding window is 95% and the EOS threshold is 90%, the system performing the method 600, continues to block 610. In block 610, the system performing the method 600, flags the sliding window as EOS. As described above, flagging a particular sliding window as EOS may trigger a component of a speech processing pipeline to generate a transcript for use by another application and/or device. However, returning to block 608, if the system performing the method 600, determines that the EOS threshold is not satisfied, the method 600 returns to block 604 and proceeds to the next sliding window. In an embodiment, the system performing the method 600, increments the sliding window by a single time step or audio frame. For example, if the current sliding window is from time step 0 to time step 25, the sliding window is modified to range from time step 1 to time step 26. In various embodiments, the number of time steps or audio frames that the sliding window is moved may also be modified.

Figure 7:
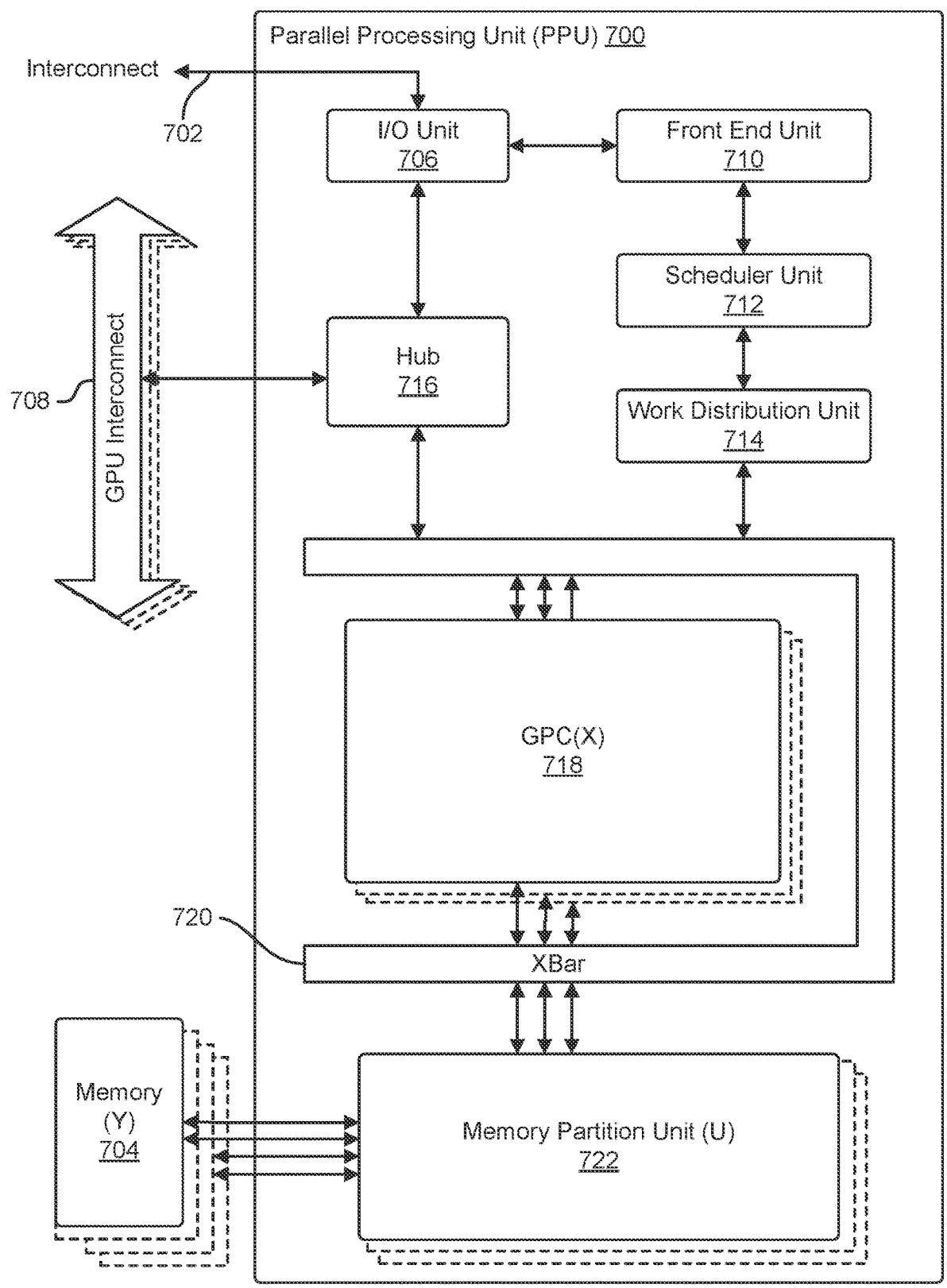
FIG. 7 illustrates an example of parallel processing unit ("PPU"), in accordance with an embodiment.

FIG. 7 illustrates a parallel processing unit ("PPU") 700, in accordance with one embodiment. In an embodiment, the PPU 700 is configured with machine-readable code that, if executed by the PPU, causes the PPU to perform some or all of the processes and techniques described throughout this disclosure. In an embodiment, the PPU 700 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 700. In an embodiment, the PPU 700 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 700 is utilized to perform computations such as linear algebra operations and machine-learning operations. FIG. 7 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 700 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, personalized user recommendations, and more.

In an embodiment, the PPU 700 includes an Input/Output ("I/O") unit 706, a front-end unit 710, a scheduler unit 712, a work distribution unit 714, a hub 716, a crossbar ("Xbar") 720, one or more general processing clusters ("GPCs") 718, and one or more partition units 722. In an embodiment, the PPU 700 is connected to a host processor or other PPUs 700 via one or more high-speed GPU interconnects 708. In an embodiment, the PPU 700 is connected to a host processor or other peripheral devices via an interconnect 702. In an embodiment, the PPU 700 is connected to a local memory comprising one or more memory devices 704. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 708 may refer to a wire-based multi-lane communications link that is used by systems to scale and include one or more PPUs 700 combined with one or more CPUs, supports cache coherence between the PPUs 700 and CPUs, and CPU mastering. In an embodiment, data and/or commands are transmitted by the high-speed GPU interconnect 708 through the hub 716 to/from other units of the PPU 700 such as one or more copy engines, video encoders, video decoders, power management units, and other components which may not be explicitly illustrated in FIG. 7.

In an embodiment, the I/O unit 706 is configured to transmit and receive communications (e.g., commands, data) from a host processor (not illustrated in FIG. 7) over the system bus 702. In an embodiment, the I/O unit 706 communicates with the host processor directly via the system bus 702 or through one or more intermediate devices such as a memory bridge. In an embodiment, the I/O unit 706 may communicate with one or more other processors, such as one or more of the PPUs 700 via the system bus 702. In an embodiment, the I/O unit 706 implements a Peripheral Component Interconnect Express ("PCIe") interface for communications over a PCIe bus. In an embodiment, the I/O unit 706 implements interfaces for communicating with external devices.

In an embodiment, the I/O unit 706 decodes packets received via the system bus 702. In an embodiment, at least some packets represent commands configured to cause the PPU 700 to perform various operations. In an embodiment, the I/O unit 706 transmits the decoded commands to various other units of the PPU 700 as specified by the commands. In an embodiment, commands are transmitted to the front-end unit 710 and/or transmitted to the hub 716 or other units of the PPU 700 such as one or more copy engines, a video encoder, a video decoder, a power management unit, etc. (not explicitly illustrated in FIG. 7). In an embodiment, the I/O unit 706 is configured to route communications between and among the various logical units of the PPU 700.

In an embodiment, a program executed by the host processor encodes a command stream in a buffer that provides workloads to the PPU 700 for processing. In an embodiment, a workload comprises instructions and data to be processed by those instructions. In an embodiment, the buffer is a region in a memory that is accessible (e.g., read/write) by both the host processor and the PPU 700—the host interface unit may be configured to access the buffer in a system memory connected to the system bus 702 via memory requests transmitted over the system bus 702 by the I/O unit 706. In an embodiment, the host processor writes the command stream to the buffer and then transmits a pointer to the start of the command stream to the PPU 700 such that the front-end unit 710 receives pointers to one or more command streams and manages the one or more streams, reading commands from the streams and forwarding commands to the various units of the PPU 700.

In an embodiment, the front-end unit 710 is coupled to a scheduler unit 712 that configures the various GPCs 718 to process tasks defined by the one or more streams. In an embodiment, the scheduler unit 712 is configured to track state information related to the various tasks managed by the scheduler unit 712 where the state information may indicate which GPC 718 a task is assigned to, whether the task is active or inactive, a priority level associated with the task, and so forth. In an embodiment, the scheduler unit 712 manages the execution of a plurality of tasks on the one or more GPCs 718.

In an embodiment, the scheduler unit 712 is coupled to a work distribution unit 714 that is configured to dispatch tasks for execution on the GPCs 718. In an embodiment, the work distribution unit 714 tracks a number of scheduled tasks received from the scheduler unit 712 and the work distribution unit 714 manages a pending task pool and an active task pool for each of the GPCs 718. In an embodiment, the pending task pool comprises a number of slots (e.g., 32 slots) that contain tasks assigned to be processed by a particular GPC 718; the active task pool may comprise a number of slots (e.g., 4 slots) for tasks that are actively being processed by the GPCs 718 such that as a GPC 718 completes the execution of a task, that task is evicted from the active task pool for the GPC 718 and one of the other tasks from the pending task pool is selected and scheduled for execution on the GPC 718. In an embodiment, if an active task is idle on the GPC 718, such as while waiting for a data dependency to be resolved, then the active task is evicted from the GPC 718 and returned to the pending task pool while another task in the pending task pool is selected and scheduled for execution on the GPC 718.

In an embodiment, the work distribution unit 714 communicates with the one or more GPCs 718 via XBar 720. In an embodiment, the XBar 720 is an interconnect network that couples many of the units of the PPU 700 to other units of the PPU 700 and can be configured to couple the work distribution unit 714 to a particular GPC 718. Although not shown explicitly, one or more other units of the PPU 700 may also be connected to the XBar 720 via the hub 716.

The tasks are managed by the scheduler unit 712 and dispatched to a GPC 718 by the work distribution unit 714. The GPC 718 is configured to process the task and generate results. The results may be consumed by other tasks within the GPC 718, routed to a different GPC 718 via the XBar 720, or stored in the memory 704. The results can be written to the memory 704 via the partition units 722, which implement a memory interface for reading and writing data to/from the memory 704. The results can be transmitted to another PPU 700 or CPU via the high-speed GPU interconnect 708. In an embodiment, the PPU 700 includes a number U of partition units 722 that is equal to the number of separate and distinct memory devices 704 coupled to the PPU 700. A partition unit 722 will be described in more detail below in conjunction with FIG. 9.

In an embodiment, a host processor executes a driver kernel that implements an application programming interface ("API") that enables one or more applications executing on the host processor to schedule operations for execution on the PPU 700. In an embodiment, multiple compute applications are simultaneously executed by the PPU 700 and the PPU 700 provides isolation, quality of service ("QoS"), and independent address spaces for the multiple compute applications. In an embodiment, an application generates instructions (e.g., in the form of API calls) that cause the driver kernel to generate one or more tasks for execution by the PPU 700 and the driver kernel outputs tasks to one or more streams being processed by the PPU 700. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 10.

Figure 8:
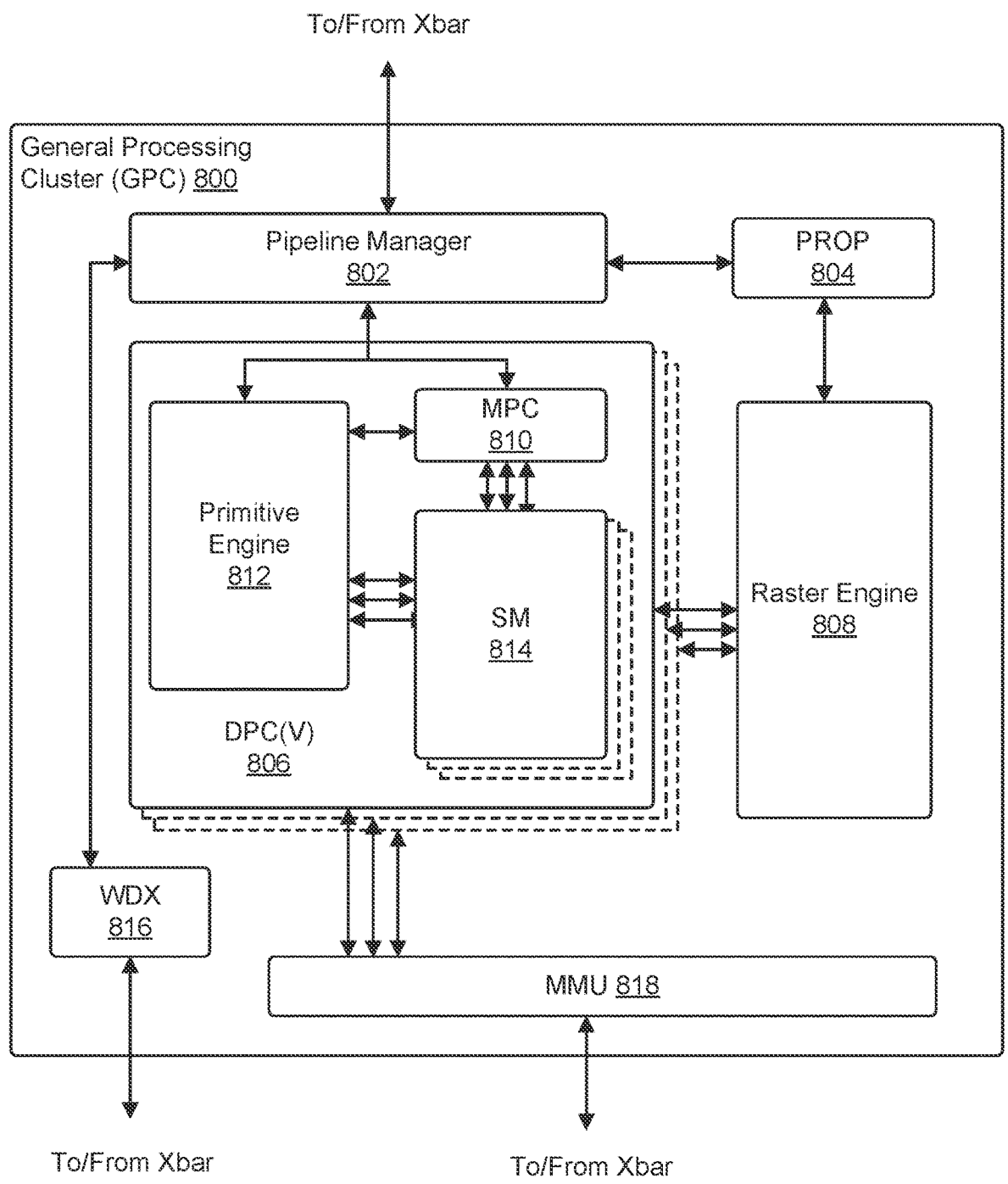
FIG. 8 illustrates an example of a general processing cluster ("GPC"), in accordance with one embodiment.

FIG. 8 illustrates a GPC 800 such as the GPC illustrated of the PPU 700 of FIG. 7, in accordance with one embodiment. In an embodiment, each GPC 800 includes a number of hardware units for processing tasks and each GPC 800 includes a pipeline manager 802, a pre-raster operations unit ("PROP") 804, a raster engine 808, a work distribution crossbar ("WDX") 816, a memory management unit ("MMU") 818, one or more Data Processing Clusters ("DPCs") 806, and any suitable combination of parts. It will be appreciated that the GPC 800 of FIG. 8 may include other hardware units in lieu of or in addition to the units shown in FIG. 8.

In an embodiment, the operation of the GPC 800 is controlled by the pipeline manager 802. The pipeline manager 802 manages the configuration of the one or more DPCs 806 for processing tasks allocated to the GPC 800. In an embodiment, the pipeline manager 802 configures at least one of the one or more DPCs 806 to implement at least a portion of a graphics rendering pipeline. In an embodiment, a DPC 806 is configured to execute a vertex shader program on the programmable streaming multiprocessor ("SM") 814. The pipeline manager 802 is configured to route packets received from a work distribution to the appropriate logical units within the GPC 800, in an embodiment, and some packets may be routed to fixed function hardware units in the PROP 804 and/or raster engine 808 while other packets may be routed to the DPCs 806 for processing by the primitive engine 812 or the SM 814. In an embodiment, the pipeline manager 802 configures at least one of the one or more DPCs 806 to implement a neural network model and/or a computing pipeline.

The PROP unit 804 is configured, in an embodiment, to route data generated by the raster engine 808 and the DPCs 806 to a Raster Operations ("ROP") unit in the memory partition unit, described in more detail above. In an embodiment, the PROP unit 804 is configured to perform optimizations for color blending, organizing pixel data, performing address translations, and more. The raster engine 808 includes a number of fixed function hardware units configured to perform various raster operations, in an embodiment, and the raster engine 808 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 808 comprises fragments to be processed by any suitable entity such as by a fragment shader implemented within a DPC 806.

In an embodiment, each DPC 806 included in the GPC 800 comprises an M-Pipe Controller ("MPC") 810; a primitive engine 812; one or more SMs 814; and any suitable combination thereof. In an embodiment, the MPC 810 controls the operation of the DPC 806, routing packets received from the pipeline manager 802 to the appropriate units in the DPC 806. In an embodiment, packets associated with a vertex are routed to the primitive engine 812, which is configured to fetch vertex attributes associated with the vertex from memory; in contrast, packets associated with a shader program may be transmitted to the SM 814.

In an embodiment, the SM 814 comprises a programmable streaming processor that is configured to process tasks represented by a number of threads. In an embodiment, the SM 814 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 814 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, an execution state is maintained for each individual thread and threads executing the same instructions which may be converged and executed in parallel for better efficiency. In an embodiment, the SM 814 is described in more detail below.

In an embodiment, the MMU 818 provides an interface between the GPC 800 and the memory partition unit, and the MMU 818 provides translation of virtual addresses into physical addresses, memory protection, and arbitration of memory requests. In an embodiment, the MMU 818 provides one or more translation lookaside buffers ("TLBs") for performing translation of virtual addresses into physical addresses in memory.

Figure 9:
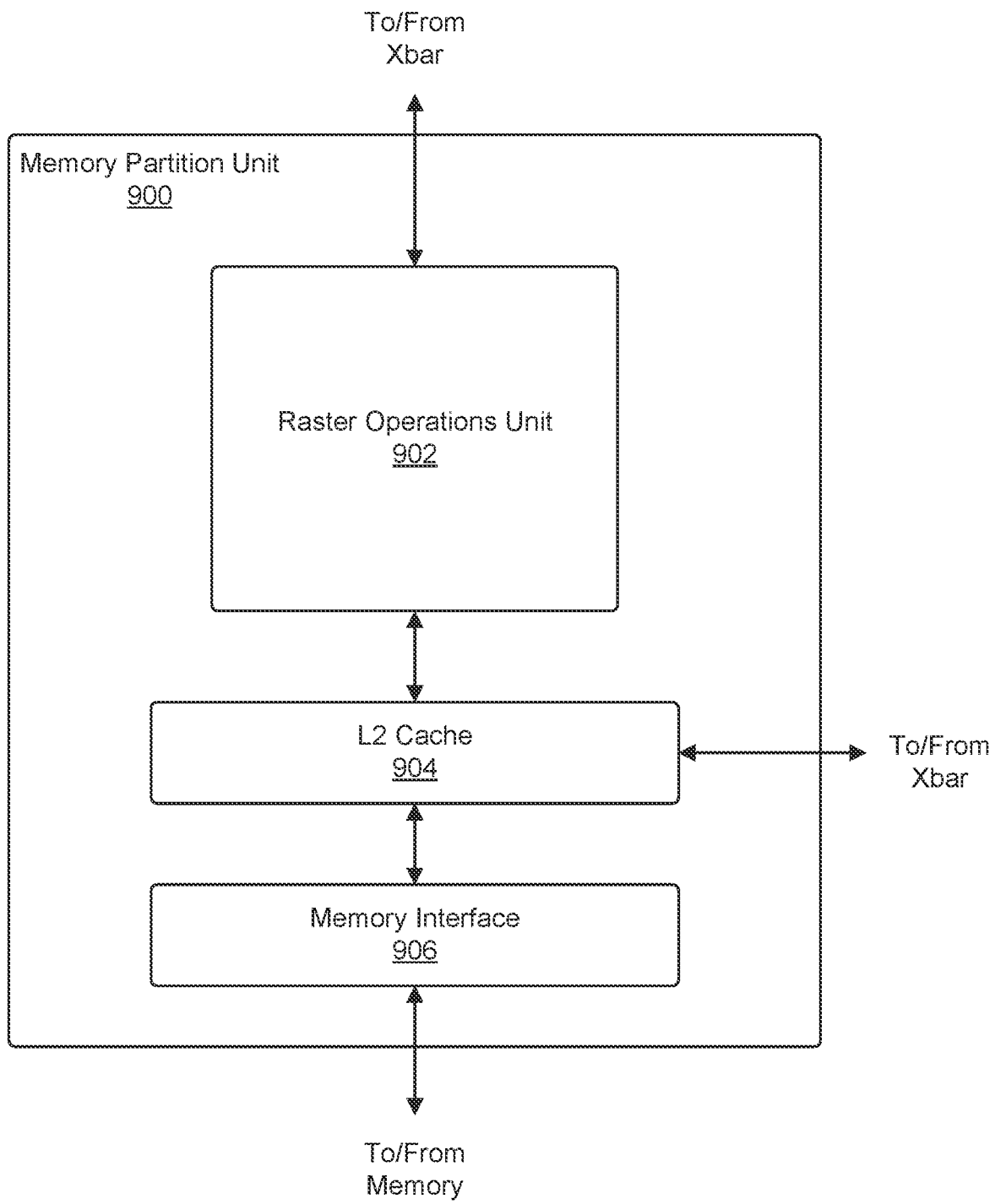
FIG. 9 illustrates an example of a memory partition unit, in accordance with one embodiment.

FIG. 9 illustrates a memory partition unit of a PPU, in accordance with one embodiment. In an embodiment, the memory partition unit 900 includes a Raster Operations ("ROP") unit 902; a level two ("L2") cache 904; a memory interface 906; and any suitable combination thereof. The memory interface 906 is coupled to the memory. Memory interface 906 may implement 32, 64, 128, 1024-bit data buses, or the like, for high-speed data transfer. In an embodiment, the PPU incorporates U memory interfaces 906, one memory interface 906 per pair of partition units 900, where each pair of partition units 900 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 906 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 900 supports a unified memory to provide a single unified virtual address space for CPU and PPU memory, enabling data sharing between virtual memory systems. In an embodiment the frequency of accesses by a PPU to memory located on other processors is traced to ensure that memory pages are moved to the physical memory of the PPU that is accessing the pages more frequently. In an embodiment, the high-speed GPU interconnect 708 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 900 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 7 or other system memory is fetched by the memory partition unit 900 and stored in the L2 cache 904, which is located on-chip and is shared between the various GPCs, in accordance with one embodiment. Each memory partition unit 900, in an embodiment, includes at least a portion of the L2 cache 904 associated with a corresponding memory device. In an embodiment, lower level caches are implemented in various units within the GPCs. In an embodiment, each of the SMs 940 may implement a level one ("L1") cache wherein the L1 cache is private memory that is dedicated to a particular SM and data from the L2 cache 904 is fetched and stored in each of the L1 caches for processing in the functional units of the SMs. In an embodiment, the L2 cache 904 is coupled to the memory interface 906 and the XBar 720.

The ROP unit 902 performs graphics raster operations related to pixel color, such as color compression, pixel blending, and more, in an embodiment. The ROP unit 902, in an embodiment, implements depth testing in conjunction with the raster engine, receiving a depth for a sample location associated with a pixel fragment from the culling engine of the raster engine. In an embodiment, the depth is tested against a corresponding depth in a depth buffer for a sample location associated with the fragment. In an embodiment, if the fragment passes the depth test for the sample location, then the ROP unit 902 updates the depth buffer and transmits a result of the depth test to the raster engine. It will be appreciated that the number of partition units 900 may be different than the number of GPCs and, therefore, each ROP unit 902 can, in an embodiment, be coupled to each of the GPCs. In an embodiment, the ROP unit 902 tracks packets received from the different GPCs and determines which of the results generated by the ROP unit 902 is routed through to the Xbar.

Figure 10:
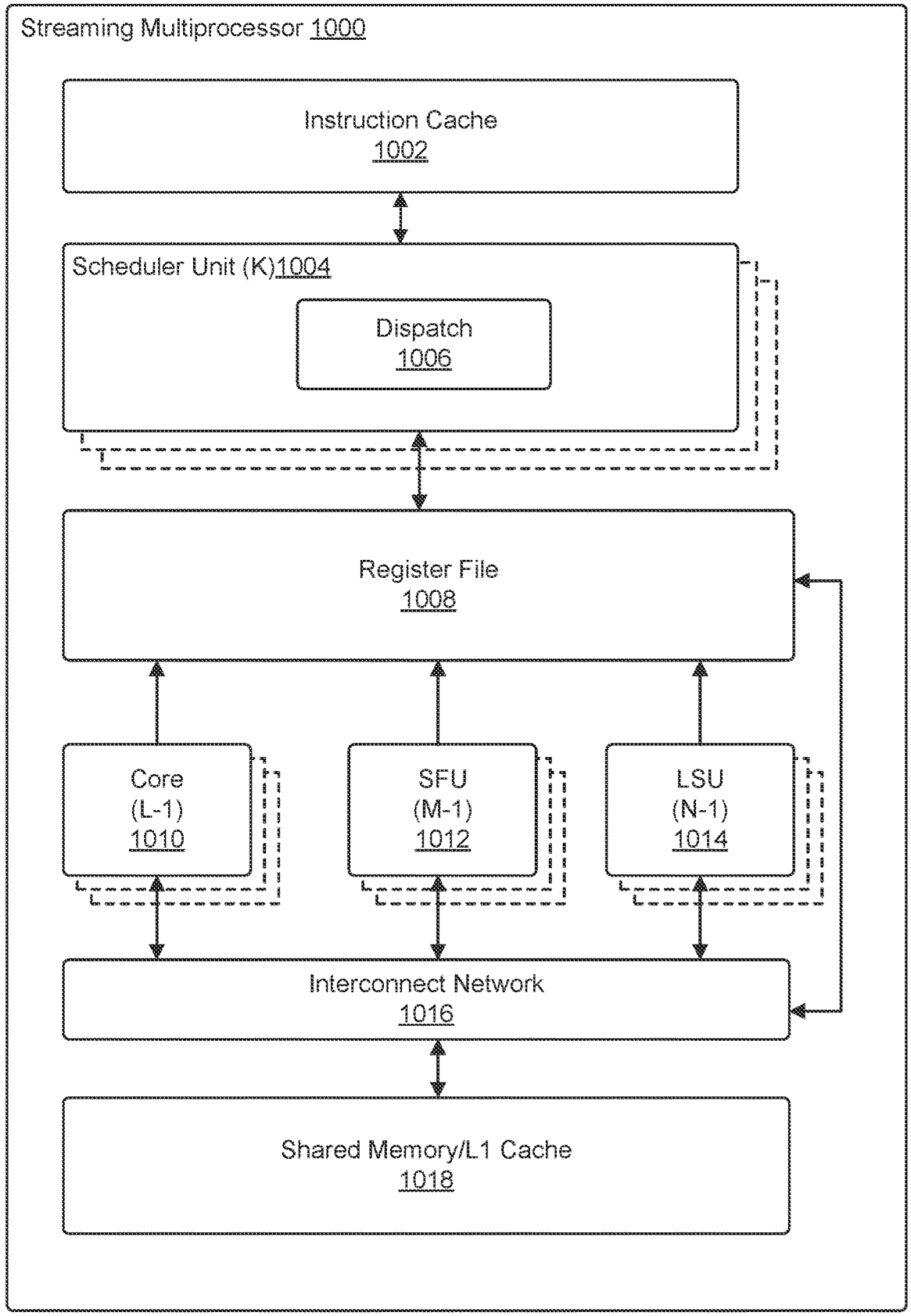
FIG. 10 illustrates an example of a streaming multi-processor, in accordance with one embodiment.

FIG. 10 illustrates a streaming multi-processor such as the streaming multi-processor of FIG. 8, in accordance with one embodiment. In an embodiment, the SM 1000 includes: an instruction cache 1002; one or more scheduler units 1004; a register file 1008; one or more processing cores 1010; one or more special function units ("SFUs") 1012; one or more load/store units ("LSUs") 1014; an interconnect network 1016; a shared memory/L1 cache 1018; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1000. In an embodiment, the scheduler unit 1004 receives the tasks from the work distribution unit and manages instruction scheduling for one or more thread blocks assigned to the SM 1000. In an embodiment, the scheduler unit 1004 schedules thread blocks for execution as warps of parallel threads, wherein each thread block is allocated at least one warp. In an embodiment, each warp executes threads. In an embodiment, the scheduler unit 1004 manages a plurality of different thread blocks, allocating the warps to the different thread blocks and then dispatching instructions from the plurality of different cooperative groups to the various functional units (e.g., cores 1010, SFUs 1012, and LSUs 1014) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1006 is configured to transmit instructions to one or more of the functional units and the scheduler unit 1004 includes two dispatch units 1006 that enable two different instructions from the same warp to be dispatched during each clock cycle. In an embodiment, each scheduler unit 1004 includes a single dispatch unit 1006 or additional dispatch units 1006.

Each SM 1000, in an embodiment, includes a register file 1008 that provides a set of registers for the functional units of the SM 1000. In an embodiment, the register file 1008 is divided between each of the functional units such that each functional unit is allocated a dedicated portion of the register file 1008. In an embodiment, the register file 1008 is divided between the different warps being executed by the SM 1000 and the register file 1008 provides temporary storage for operands connected to the data paths of the functional units. In an embodiment, each SM 1000 comprises a plurality of L processing cores 1010. In an embodiment, the SM 1000 includes a large number (e.g., 128 or more) of distinct processing cores 1010. Each core 1010, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1010 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1010. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation, $D = A \times B + C$ where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1000 comprises M SFUs 1012 that perform special functions (e.g., attribute evaluation, reciprocal square root, and the like). In an embodiment, the SFUs 1012 include a tree traversal unit configured to traverse a hierarchical tree data structure. In an embodiment, the SFUs 1012 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1000. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1000 includes two texture units.

Each SM 1000 comprises N LSUs 954 that implement load and store operations between the shared memory/L1 cache 1018 and the register file 1008, in an embodiment. Each SM 1000 includes an interconnect network 1016 that connects each of the functional units to the register file 1008 and the LSU 1014 to the register file 1008, shared memory/L1 cache 1018 in an embodiment. In an embodiment, the interconnect network 1016 is a crossbar that can be configured to connect any of the functional units to any of the registers in the register file 1008 and connect the LSUs 1014 to the register file and memory locations in shared memory/L1 cache 1018.

The shared memory/L1 cache 1018 is an array of on-chip memory that allows for data storage and communication between the SM 1000 and the primitive engine and between threads in the SM 1000 in an embodiment. In an embodiment, the shared memory/L1 cache 1018 comprises 128 KB of storage capacity and is in the path from the SM 1000 to the partition unit. The shared memory/L1 cache 1018, in an embodiment, is used to cache reads and writes. One or more of the shared memory/L1 cache 1018, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1018 enables the shared memory/L1 cache 1018 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1000 to execute the program and perform calculations, shared memory/L1 cache 1018 to communicate between threads, and the LSU 1014 to read and write global memory through the shared memory/L1 cache 1018 and the memory partition unit, in accordance with one embodiment. In an embodiment, when configured for general purpose parallel computation, the SM 1000 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 11:
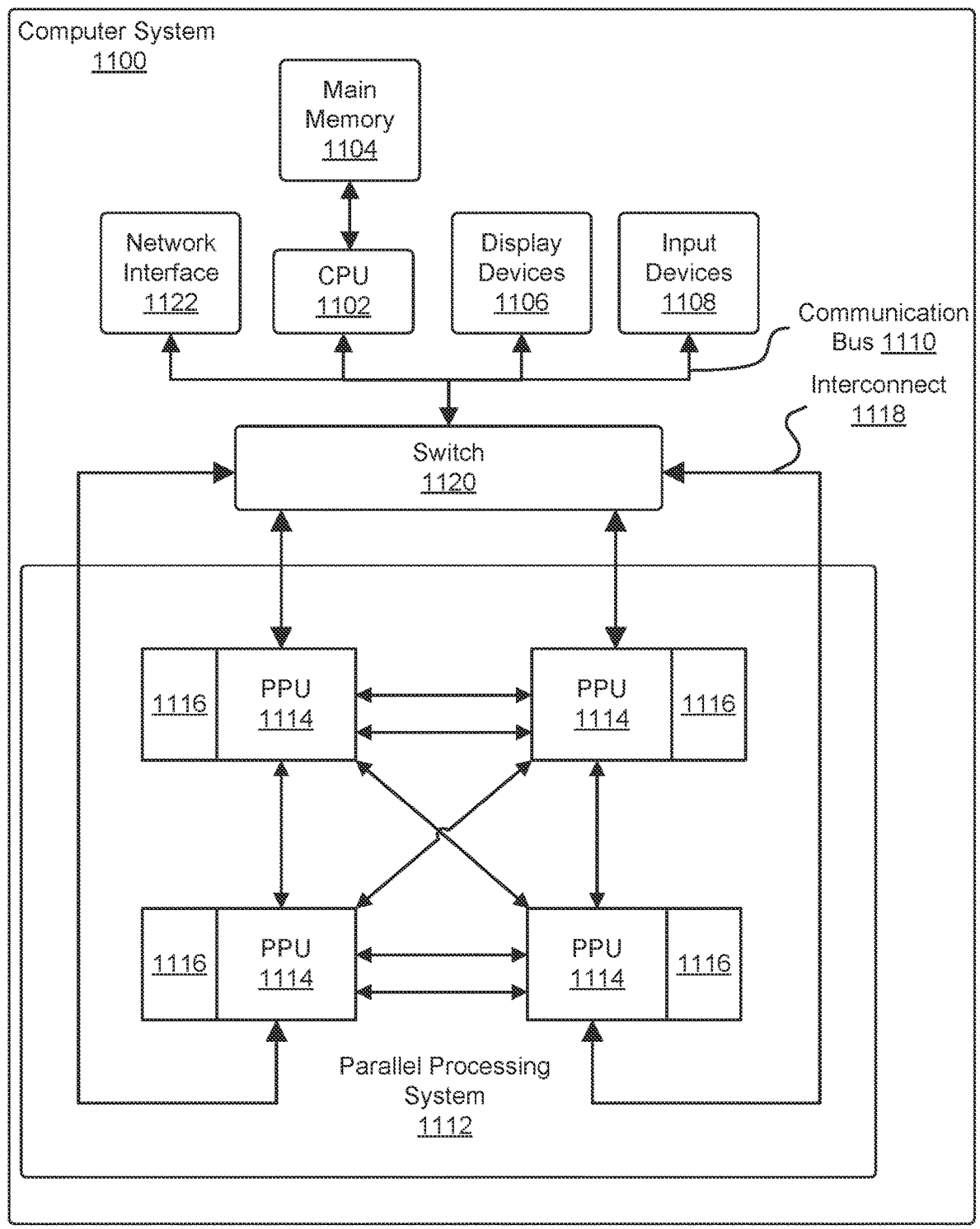
FIG. 11 illustrates a computer system in which the various examples can be implemented, in accordance with one embodiment.

FIG. 11 illustrates a computer system 1100 in which the various architecture and/or functionality can be implemented, in accordance with one embodiment. The computer system 1100, in an embodiment, is configured to implement various processes and methods described throughout this disclosure. In one or more embodiments, the computer system 1100 may be one of several similarly configured computer systems operating collectively in or as a component of a data center, and used for tasks such as training machine learning models, providing a cloud computing environment, hosting one or more virtual machines, and other high-performance computing tasks. In one or more embodiments, the computer system 1100 may be an edge device such as an Internet of Things (IoT) device, communicatively coupled to one or more other IoT devices and/or an on-premise server.

In an embodiment, the computer system 1100 comprises at least one central processing unit 1102 that is connected to a communication bus 1110 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1100 includes a main memory 1104 and control logic (e.g., implemented as hardware, software, or a combination thereof) and data are stored in the main memory 1104 which may take the form of random access memory ("RAM"). In an embodiment, a network interface subsystem 1122 provides an interface to other computing devices and networks for receiving data from and transmitting data to other systems from the computer system 1100.

The computer system 1100, in an embodiment, includes input devices 1108, the parallel processing system 1112, and display devices 1106 which can be implemented using a conventional CRT (cathode ray tube), LCD (liquid crystal display), LED (light emitting diode), plasma display, or other suitable display technologies. In an embodiment, user input is received from input devices 1108 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1104 and/or secondary storage. Computer programs, if executed by one or more processors, enable the system 1100 to perform various functions in accordance with one embodiment. The memory 1104, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1102; parallel processing system 1112; an integrated circuit capable of at least a portion of the capabilities of both the central processor 1102; the parallel processing system 1112; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1100 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1112 includes a plurality of PPUs 1114 and associated memories 1116. In an embodiment, the PPUs are connected to a host processor or other peripheral devices via an interconnect 1118 and a switch 1120 or multiplexer. In an embodiment, the parallel processing system 1112 distributes computational tasks across the PPUs 1114 which can be parallelizable—for example, as part of the distribution of computational tasks across multiple GPU thread blocks. In an embodiment, memory is shared and accessible (e.g., for read and/or write access) across some or all of the PPUs 1114, although such shared memory may incur performance penalties relative to the use of local memory and registers resident to a PPU. In an embodiment, the operation of the PPUs 1114 is synchronized through the use of a command such as syncthreads( ) which requires all threads in a block (e.g., executed across multiple PPUs 1114) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Servers and Data Centers

The following figures set forth, without limitation, exemplary network server and data center based systems that can be used to implement at least one embodiment.

Figure 12:
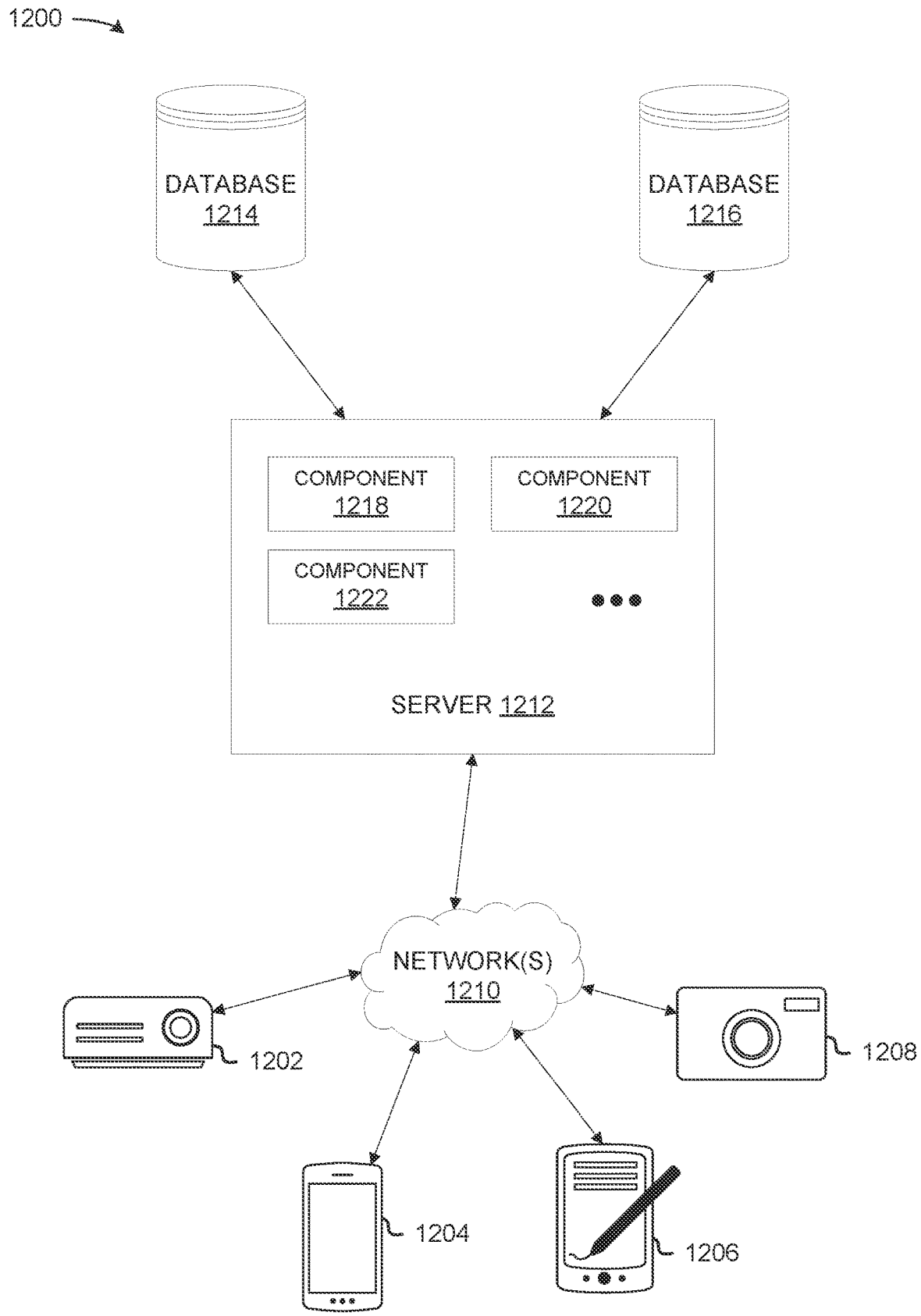
FIG. 12 illustrates a distributed system, in accordance with at least one embodiment.

FIG. 12 illustrates a distributed system 1200, in accordance with at least one embodiment. In at least one embodiment, distributed system 1200 includes one or more client computing devices 1202, 1204, 1206, and 1208, which are configured to execute and operate a client application such as a web browser, proprietary client, and/or variations thereof over one or more network(s) 1210. For example, the one or more client computing devices 1202, 1204, 1206, and 1208 execute an application to implement an audio capture device as described above. In at least one embodiment, server 1212 may be communicatively coupled with remote client computing devices 1202, 1204, 1206, and 1208 via network 1210. Furthermore, the server 1212, in various embodiments, executes the audio analyzer and/or components of the speech processing pipeline as described above.

In at least one embodiment, server 1212 may be adapted to run one or more services or software applications such as services and applications that may manage session activity of single sign-on (SSO) access across multiple data centers. In at least one embodiment, server 1212 may also provide other services or software applications which can include non-virtual and virtual environments. In at least one embodiment, these services may be offered as web-based or cloud services or under a Software as a Service (SaaS) model to users of client computing devices 1202, 1204, 1206, and/or 1208. In at least one embodiment, users operating client computing devices 1202, 1204, 1206, and/or 1208 may in turn utilize one or more client applications to interact with server 1212 to utilize services provided by these components.

In at least one embodiment, software components 1218, 1220 and 1222 of system 1200 are implemented on server 1212. In at least one embodiment, one or more components of system 1200 and/or services provided by these components may also be implemented by one or more of client computing devices 1202, 1204, 1206, and/or 1208. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

In at least one embodiment, client computing devices 1202, 1204, 1206, and/or 1208 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1210. Although distributed system 1200 in FIG. 12 is shown with four client computing devices, any number of client computing devices may be supported. Other devices, such as devices with sensors, etc., may interact with server 1212.

In at least one embodiment, network(s) 1210 in distributed system 1200 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 1210 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 1212 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 1212 using software defined networking. In at least one embodiment, server 1212 may be adapted to run one or more services or software applications.

In at least one embodiment, server 1212 may run any operating system, as well as any commercially available server operating system. In at least one embodiment, server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, distributed system 1200 may also include one or more databases 1214 and 1216. In at least one embodiment, databases may provide a mechanism for storing information such as audio, rate of speech information, user information, usage patterns information, adaptation rules information, and other information. In at least one embodiment, databases 1214 and 1216 may reside in a variety of locations. In at least one embodiment, one or more of databases 1214 and 1216 may reside on a non-transitory storage medium local to (and/or resident in) server 1212. In at least one embodiment, databases 1214 and 1216 may be remote from server 1212 and in communication with server 1212 via a network-based or dedicated connection. In at least one embodiment, databases 1214 and 1216 may reside in a storage-area network (SAN). In at least one embodiment, any necessary files for performing functions attributed to server 1212 may be stored locally on server 1212 and/or remotely, as appropriate. In at least one embodiment, databases 1214 and 1216 may include relational databases, such as databases that are adapted to store, update, and retrieve data in response to SQL-formatted commands.

Figure 13:
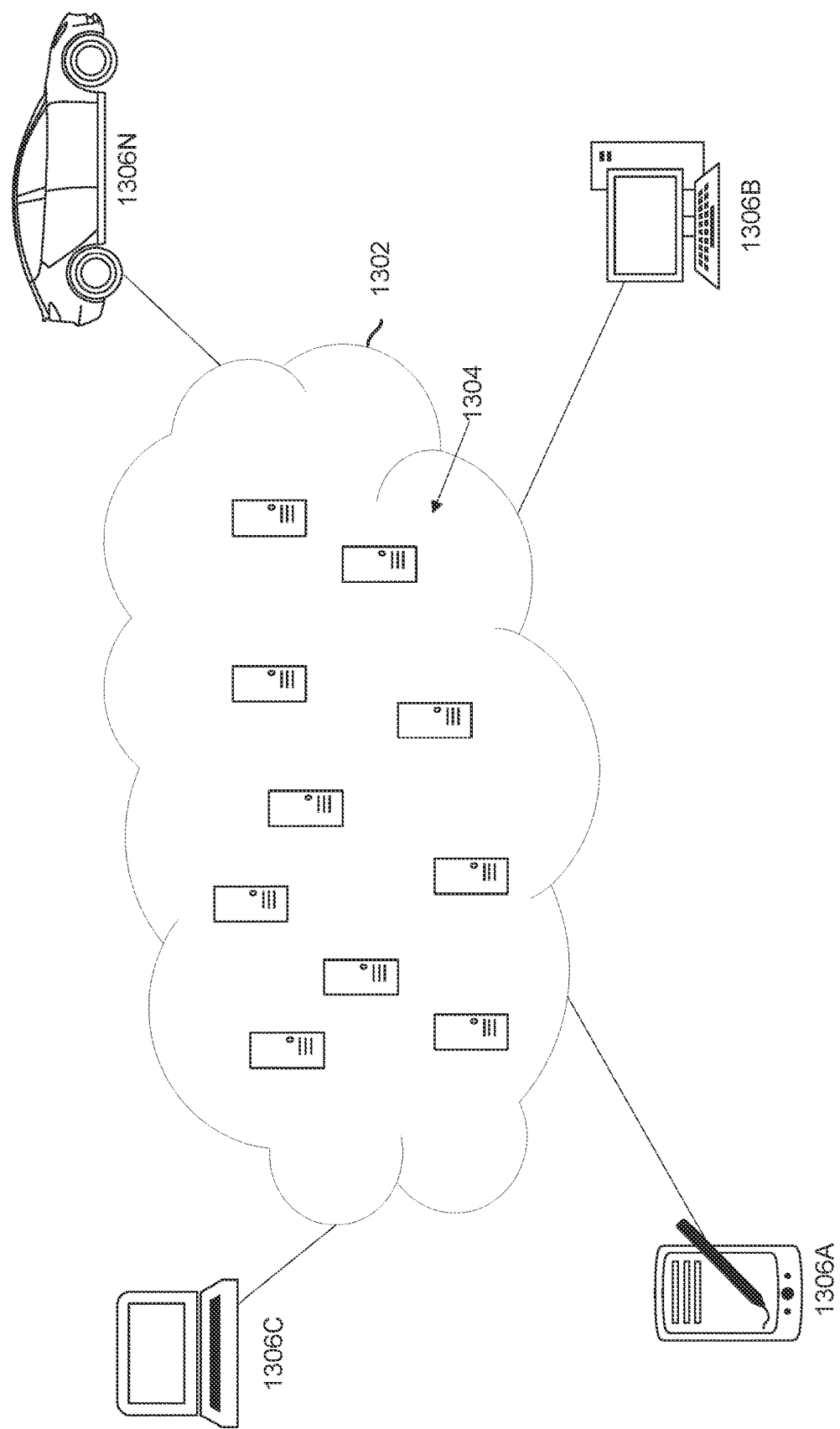
FIG. 13 illustrates a cloud computing environment, in accordance with at least one embodiment.

FIG. 13 illustrates a cloud computing environment 1302, in accordance with at least one embodiment. In at least one embodiment, cloud computing environment 1302 comprises one or more computer system/servers 1304 with which computing devices such as a personal digital assistant (PDA) or cellular telephone 1306A, desktop computer 1306B, laptop computer 1306C, and/or automobile computer system 1306N communicate. In at least one embodiment, this allows for infrastructure, platforms and/or software to be offered as services from cloud computing environment 1302, so as to not require each client to separately maintain such resources. It is understood that the types of computing devices 1306A-N shown in FIG. 13 are intended to be illustrative only and that cloud computing environment 1302 can communicate with any type of computerized device over any type of network and/or network/addressable connection (e.g., using a web browser). In various embodiments, the computing devices 1306A-N may simply capture audio and communicate the captured audio (e.g., input audio) to the one or more computer system/servers 1304. For example, the automobile computer system 1306N transmits capture audio from within the cabin directly to the one or more computer system/servers 1304 without processing the captured audio.

In at least one embodiment, a computer system/server 1304, which can be denoted as a cloud computing node, is operational with numerous other general purpose or special purpose computing system environments or configurations. In at least one embodiment, examples of computing systems, environments, and/or configurations that may be suitable for use with computer system/server 1304 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 1304 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/server 1304 may be practiced in distributed cloud computing environments where tasks are performed by remote processing devices that are linked through a communications network. In at least one embodiment, in a distributed cloud computing environment, program modules may be located in both local and remote computer system storage media including memory storage devices.

Figure 14:
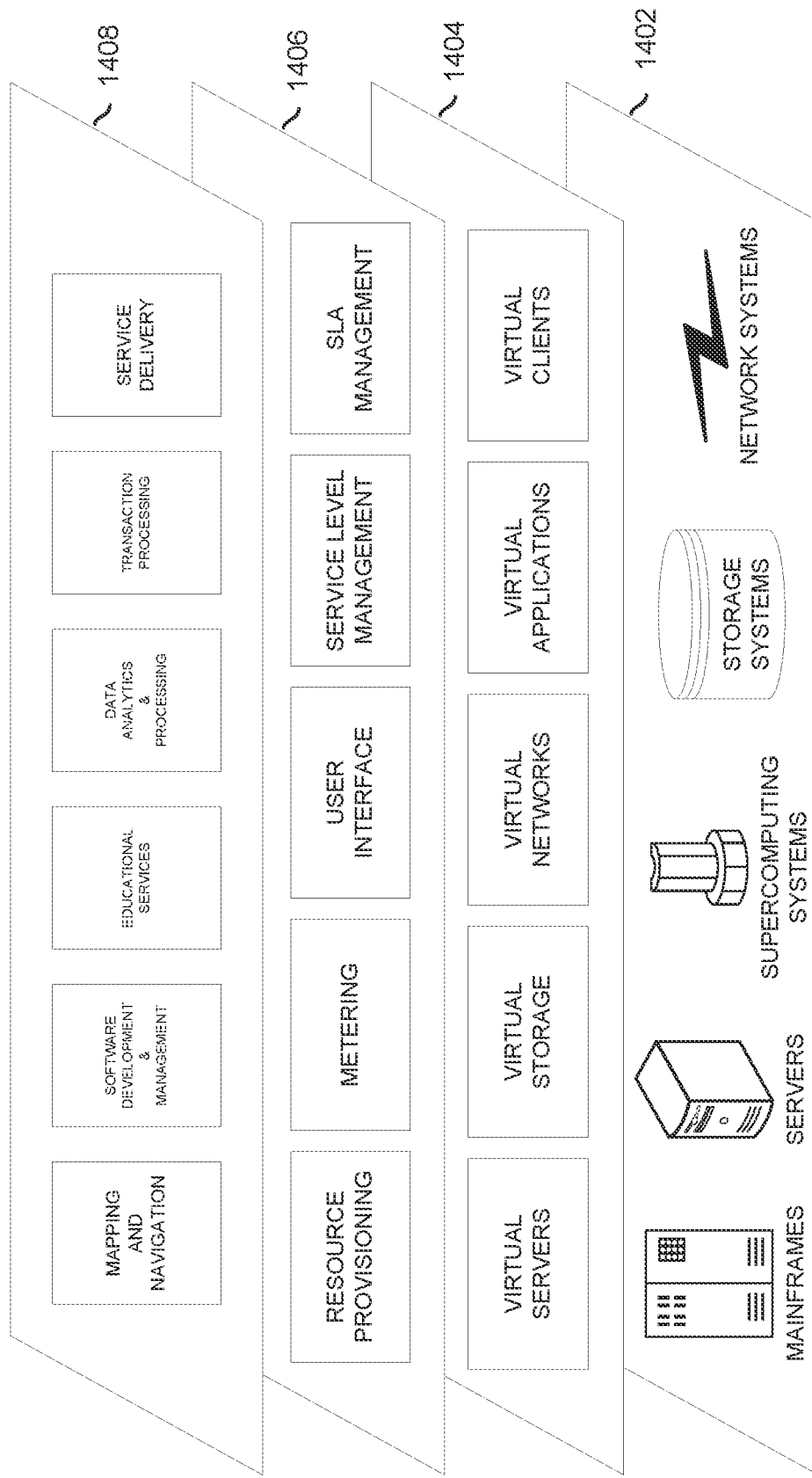
FIG. 14 illustrates a set of functional abstraction layers provided by a cloud computing environment, in accordance with at least one embodiment.

FIG. 14 illustrates a set of functional abstraction layers provided by cloud computing environment 1302 (FIG. 13), in accordance with at least one embodiment. It should be understood in advance that components, layers, and functions shown in FIG. 14 are intended to be illustrative only, and components, layers, and functions may vary.

In at least one embodiment, hardware and software layer 1402 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 1404 provides an abstraction layer from which following exemplary virtual entities may be provided: virtual servers, virtual storage, virtual networks, including virtual private networks, virtual applications, virtual clients, and/or variations thereof.

In at least one embodiment, management layer 1406 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 1408 provides functionality for which a cloud computing environment is utilized. In at least one embodiment, examples of workloads and functions which may be provided from this layer include: mapping and navigation, software development and management, educational services, data analytics and processing, transaction processing, and service delivery. For example, the workloads layer 1408 may perform all or a portion of the speech processing pipeline as described above.

What is claimed is:

1. A method comprising:
   determining an end of speech (EOS) threshold based at least in part on a rate of speech;
   predicting, for at least one segment of a set of segments of an audio input, a set of characters representative of the at least one segment, wherein the set of characters comprises one or more blank characters that appear in between non-blank characters; and
   determining an EOS corresponding to the at least one segment based at least in part on a determination that the EOS threshold is satisfied for the set of characters predicted for the at least one segment, wherein the EOS threshold indicates a percentage of blank characters within the set of characters.

2. The method of claim 1, wherein the set of characters predicted for the segment is generated by a connectionist temporal classification (CTC) function generating, as an output, a probability distribution for a character of the set of characters.

3. The method of claim 2, wherein the rate of speech is determined based at least in part on a set of inter-word intervals.

4. The method of claim 3, wherein determining the EOS threshold further comprises modifying the EOS threshold based at least in part on a maximum inter-word interval of the set of inter-word intervals.

5. The method of claim 3, wherein determining the EOS threshold further comprises modifying the EOS threshold based at least in part on a mean of the set of inter-word intervals.

6. The method of claim 3, wherein determining the EOS threshold further comprises modifying the EOS threshold based at least in part on a variance of the set of inter-word intervals and a maximum inter-word interval of the set of inter-word intervals.

7. The method of claim 3, wherein the set of inter-word intervals is calculated by at least determining an amount of time between a first subset of characters of the set of characters and a second subset of characters of the set of characters.

8. The method of claim 7, wherein the amount of time corresponds to a number of segments of the set of segments.

9. The method of claim 7, wherein the set of characters is determined by at least applying a greedy selection algorithm to the output of the CTC function.

10. The method of claim 9, wherein the first subset of characters and the second subset of characters further comprise a blank character.

11. The method of claim 1, wherein:
the percentage of blank characters is a threshold percentage of blank characters; and
determining the EOS corresponding to the at least one segment of the set of segments further comprises determining a predicted percentage of blank characters included in the set of characters predicted for the at least one segment, and determining the EOS threshold is satisfied based at least in part on the predicted percentage and the threshold percentage.

12. The method of claim 11, wherein determining the EOS threshold is satisfied when the predicted percentage exceeds the threshold percentage.

13. The method of claim 1, wherein determining the EOS corresponding to the at least one segment of the set of segments further comprises using a sliding widow to identify the at least one segment before predicting the set of characters.

14. The method of claim 1, wherein predicting the set of one or more characters comprises using one or more neural networks to predict the set of one or more characters.

15. The method of claim 14, wherein the predicting the set of one or more characters further comprises applying an output of the one or more neural networks to a connectionist temporal classification (CTC) function that generates, as an output, a probability distribution for a character of the set of characters and provides the probability distribution to an EOS detector.

16. A system comprising:
one or more processors; and
memory storing instructions that, as a result of being executed by the one or more processors, cause the system to:
generate a determination of an end of speech (EOS) threshold based at least in part on a rate of speech, wherein the EOS threshold indicates a number of blank characters within a set of characters within a window of audio, the set of characters comprising blank characters that are located in between non-blank characters; and
generate a determination of an EOS for the window of audio based at least in part on the EOS threshold.

17. The system of claim 16, wherein the memory further includes instructions that as a result of being executed by the one or more processors, cause the system to obtain a set of characters predicted for the window of audio generated using at least one of: one or more neural networks implementing a neural acoustic model or a connectionist temporal classification (CTC) function.

18. The system of claim 16, wherein the memory further includes instructions that as a result of being executed by the one or more processors, cause the system to:
obtain a set of words from an audio signal, where the window of audio represents a portion of the audio signal; and
determine the rate of speech based at least in part on a set of inter-word intervals determined based at least in part on the set of words.

19. The system of claim 16, wherein the memory further includes instructions that as a result of being executed by the one or more processors, cause the system to determine the rate of speech based at least in part on a maximum value of a set of inter-word intervals calculated based at least in part on a set of words included in a set of windows representing an audio signal, where the window of audio is a member of the set of windows.

20. The system of claim 16, wherein the window of audio includes a plurality of time steps of an audio signal including speech.

21. The system of claim 16, wherein the memory further includes instructions that as a result of being executed by the one or more processors, cause the system to execute a speech processing pipeline; and
wherein instructions that cause the system to generate the determination of the EOS further include instructions that as a result of being executed by the one or more processors, cause the system to generate the determination of the EOS as part of the speech processing pipeline.

22. The system of claim 21, wherein generating the determination of the EOS is executed by an EOS detector of the speech processing pipeline.

23. A method comprising:
flagging a subset of audio frames of a set of audio frames of an audio signal as end of speech (EOS) based at least in part on an EOS threshold, wherein the EOS threshold is determined based at least in part on a set of inter-word intervals and indicates a percentage of blank characters within the set of characters predicted from the subset of audio frames, the set of characters comprising a subset of the blank characters that appear in between non-blank characters.

24. The method of claim 23, wherein the method further comprises determining the set of inter-word intervals based at least in part on a set of characters generated by a connectionist temporal classification (CTC) function using as an input a set of features of the set of audio frames generated by an acoustic model.

25. The method of claim 23, further comprising:
determining an average interval of the set of inter-word intervals, the EOS threshold being based at least in part on the average interval of the set of inter-word intervals.

26. The method of claim 23, wherein the method further comprises generating a transcript of the audio signal as a result of flagging the subset of audio frames as EOS.

27. The method of claim 23, wherein the method further comprises providing the EOS threshold to a speech recognition pipeline.

28. A processor comprising: one or more arithmetic logic units (ALUs) to generate a determination of an EOS threshold based at least in part on a rate of speech using one or more neural networks, at least in part, by:
- predicting, by the one or more neural networks, for a segment of a set of segments of an audio input, a set of characters associated with the segment; and
- determining, by the one or more neural networks, an EOS corresponding to the segment based at least in part on a determination that the EOS threshold is satisfied for the set of characters associated with the segment, wherein the EOS threshold indicates a percentage of blank characters within the set of characters, the set of characters comprising a two or more of the blank characters that are located in between non-blank characters.

29. The processor of claim 28, wherein the one or more neural networks further comprise a neural acoustic model.

30. The processor of claim 28, wherein the one or more neural networks are used to implement a speech processing pipeline.

31. The processor of claim 28, wherein the one or more ALUs further determine a set of inter-word intervals based at least in part on a set of characters generated by a connectionist temporal classification (CTC) function using as an input a set of features of the set of segments of the audio input generated by an acoustic model.

* * * * *